US010554935B2

(12) United States Patent
Yamaguchi et al.

(10) Patent No.: US 10,554,935 B2
(45) Date of Patent: *Feb. 4, 2020

(54) WEARABLE CAMERA SYSTEM, AND VIDEO RECORDING CONTROL METHOD FOR WEARABLE CAMERA SYSTEM

(71) Applicant: Panasonic i-PRO Sensing Solutions Co., Ltd., Fukuoka (JP)

(72) Inventors: Kazuhiko Yamaguchi, Fukuoka (JP); Yasushi Yokomitsu, Fukuoka (JP); Haruo Tagawa, Fukuoka (JP); Ryoko Tanabiki, Fukuoka (JP)

(73) Assignee: Panasonic I-PRO Sensing Solutions Co., Ltd., Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,925

(22) Filed: Dec. 5, 2018

(65) Prior Publication Data
US 2019/0110025 A1 Apr. 11, 2019

Related U.S. Application Data

(63) Continuation of application No. 15/818,409, filed on Nov. 20, 2017, now Pat. No. 10,356,371, which is a (Continued)

(30) Foreign Application Priority Data

Jan. 29, 2015 (JP) ................................ 2015-015707
Jan. 29, 2015 (JP) ................................ 2015-015708
Jan. 29, 2015 (JP) ................................ 2015-015709

(51) Int. Cl.
H04N 7/18 (2006.01)
H04N 5/232 (2006.01)
(Continued)

(52) U.S. Cl.
CPC ............ H04N 7/183 (2013.01); G06F 1/163 (2013.01); H04N 5/23206 (2013.01);
(Continued)

(58) Field of Classification Search
CPC ...... G06F 1/163; H04N 5/23206; H04N 5/77; H04N 7/181; H04N 7/183; H04N 7/185; H04N 9/8205
See application file for complete search history.

(56) References Cited

U.S. PATENT DOCUMENTS 7,483,485 B2   1/2009  Winningstad et al.
8,781,292 B1   7/2014  Ross et al.
(Continued)

FOREIGN PATENT DOCUMENTS

CN   101180803 A       5/2008
EP   2 109 110 A1    10/2009
(Continued)

OTHER PUBLICATIONS

International Search Report, dated Feb. 23, 2016, for corresponding International Application No. PCT/JP2015/006093, dated Feb. 23, 2016, 9 pages.
(Continued)

Primary Examiner — Mohammed S Rahaman
(74) Attorney, Agent, or Firm — Seed IP Law Group LLP

(57) ABSTRACT

A wearable camera system includes a wearable camera, an in-car recorder, and an in-car camera. One of the in-car recorder and the wearable camera transmits video recording starting information including information indicating that video recording has been started to the other of the in-car recorder and the wearable camera when one of the in-car recorder and the wearable camera starts the video recording.
(Continued)

The other of the in-car recorder and the wearable camera starts video recording after the video recording starting information is received.

21 Claims, 28 Drawing Sheets

Related U.S. Application Data continuation of application No. 14/954,707, filed on Nov. 30, 2015, now Pat. No. 9,854,211.

(51) Int. Cl.
    *G06F 1/16*     (2006.01)
    *H04N 5/77*     (2006.01)
    *H04N 9/82*     (2006.01)

(52) U.S. Cl.
    CPC ............... *H04N 5/77* (2013.01); *H04N 7/181* (2013.01); *H04N 7/185* (2013.01); *H04N 9/8205* (2013.01)

(56) References Cited

U.S. PATENT DOCUMENTS

| | | | |
|---|---|---|---|
| 2001/0019657 A1 | 9/2001 | McGrath et al. | |
| 2004/0131184 A1* | 7/2004 | Wu | G08B 13/19647 380/202 |
| 2006/0098088 A1* | 5/2006 | Raghunath | H04N 5/782 348/61 |
| 2006/0165160 A1 | 7/2006 | Winningstad et al. | |
| 2006/0171539 A1 | 8/2006 | Winningstad et al. | |
| 2009/0174779 A1 | 7/2009 | Winningstad et al. | |
| 2010/0191973 A1* | 7/2010 | Huntzicker | H04L 63/0823 713/176 |
| 2011/0018998 A1* | 1/2011 | Guzik | H04N 21/21 348/143 |
| 2011/0057783 A1 | 3/2011 | Yagi et al. | |
| 2011/0059696 A1 | 3/2011 | Rasmussen et al. | |
| 2012/0077432 A1* | 3/2012 | Rose | H04B 5/0062 455/41.1 |
| 2015/0086175 A1* | 3/2015 | Lorenzetti | H04N 9/8211 386/226 |
| 2016/0119667 A1 | 4/2016 | Layson, Jr. et al. | |
| 2016/0182850 A1 | 6/2016 | Thompson | |

FOREIGN PATENT DOCUMENTS

| | | |
|---|---|---|
| JP | 09-98395 A | 4/1997 |
| JP | 2002-300570 A | 10/2001 |
| JP | 2003-23565 A | 1/2003 |
| JP | 2004-236347 A | 8/2004 |
| JP | 2006-140816 A | 6/2006 |
| JP | 2006-148842 A | 6/2006 |
| JP | 2007-293507 A | 11/2007 |
| JP | 2008-529354 A | 7/2008 |
| JP | 2009-267827 A | 11/2009 |
| JP | 2012-194713 A | 10/2012 |
| JP | 2014-102586 A | 6/2014 |
| WO | 2006/081053 A2 | 8/2006 |
| WO | 2013/111494 A1 | 8/2013 |

OTHER PUBLICATIONS

POV.1.5 User Manual, 2008 at http://www.vio-pov.com/marketing/files/manuals/POV15_User_Manual.pdf.

"Wearable Camera systems", System Assessment, Homeland Security, Mar. 2012 at http://storage.vievu.com/web/documents/Wearable-Camera-Systems_SUM.pdf.

\* cited by examiner

| STATE OF ATTRIBUTE SELECTING SWITCH | ATTRIBUTE INFORMATION |
|---|---|
| C1 | DRIVING UNDER THE INFLUENCE |
| C2 | DRUG ABUSE VIOLATIONS |
| C3 | STOLEN PROPERTY |

FIG. 12

| VIDEO DATA ID | META INFORMATION ||||||
|---|---|---|---|---|---|---|
| | VIDEO POSITION INFORMATION | Car ID | Officer ID | INCIDENT CATEGORY | VIDEO RECORDING STARTING FACTOR | OTHER INFORMATION |
| ID1 | 2014/12/01 12:00:00 | Car0010 | User0123 | DRIVING UNDER THE INFLUENCE | IN-CAR SYSTEM CONJUNCTION | ... |
| ID2 | 2014/12/01 14:05:30 | Car0010 | User0123 | DRUG ABUSE VIOLATIONS | IN-CAR SYSTEM CONJUNCTION | ... |
| | : | : | : | : | : | : |

FIG. 13

| VIDEO DATA ID | META INFORMATION | | | | | |
|---|---|---|---|---|---|---|
| | VIDEO POSITION INFORMATION | Car ID | Officer ID | INCIDENT CATEGORY | VIDEO RECORDING STARTING FACTOR | OTHER INFORMATION |
| ID11 | 2014/11/01 12:00:00 | Car1010 | User1123 | DRIVING UNDER THE INFLUENCE | WCAM CONJUNCTION | ... |
| ID12 | 2014/11/01 14:05:30 | Car1010 | User1123 | STOLEN PROPERTY | WCAM CONJUNCTION | ... |
| : | : | : | : | : | : | : |

FIG. 18

| PAIR | WCAM NAME | IP ADDRESS |
|---|---|---|
| No | WCAM-1 | 10.13.222.22 |
| Yes | WCAM-2 | 10.13.33.183 |
| No | WCAM-5 | 10.13.22.234 |
| No | WCAM-8 | 10.13.9.42 |
| No | WCAM-12 | 10.13.9.33 |

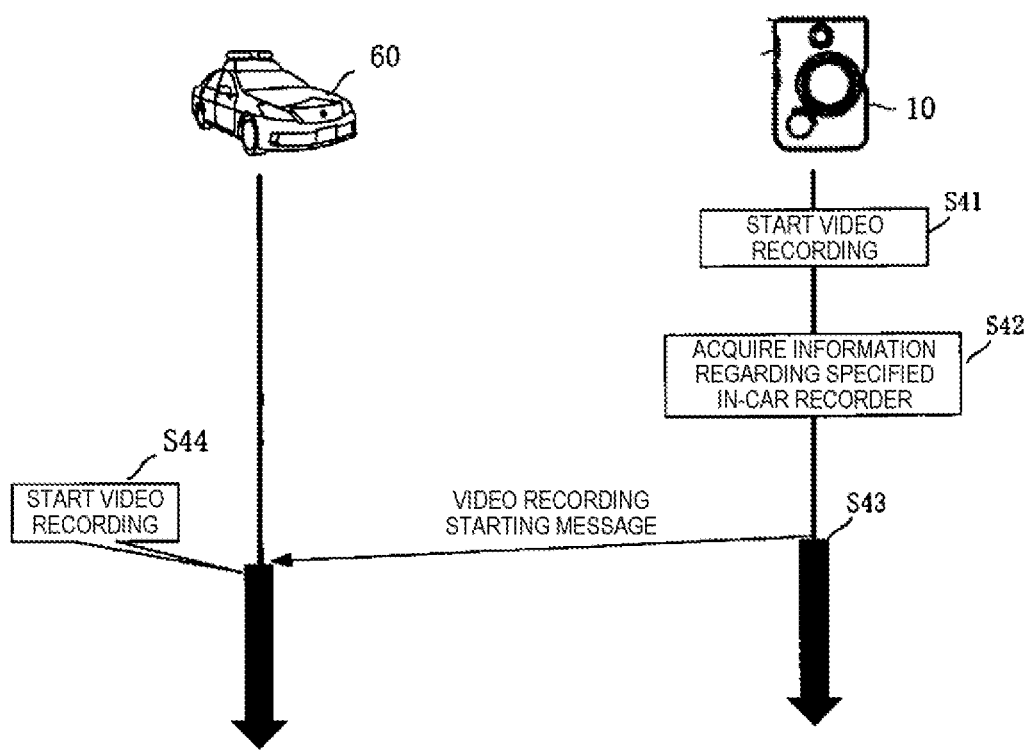

FIG. 22

| STATE OF ATTRIBUTE SELECTING SWITCH | ATTRIBUTE INFORMATION |
|---|---|
| C1 | DRIVING UNDER THE INFLUENCE |
| C2 | DRUG ABUSE VIOLATIONS |
| C3 | STOLEN PROPERTY |

FIG. 23

| No | ATTRIBUTE INFORMATION |
|---|---|
| 1 | DISORDERLY CONDUCT |
| 2 | DRIVING UNDER THE INFLUENCE |
| 3 | DRUNKENNESS |
| 4 | DRUG ABUSE VIOLATIONS |
| 5 | LIQUOR LAW VIOLATIONS |
| 6 | PEEPING TOM |
| 7 | TRESPASS OF REAL PROPERTY |
| 8 | STOLEN PROPERTY |
| 9 | VANDALISM |
| 10 | WEAPONS |
| 11 | ALL OTHER OFFENSES |

FIG. 25

| VIDEO DATA ID | META INFORMATION ||||||
|---|---|---|---|---|---|---|
| | VIDEO POSITION INFORMATION | Car ID | Officer ID | INCIDENT CATEGORY | VIDEO RECORDING STARTING FACTOR | OTHER INFORMATION |
| ID1 | 2014/12/01 12:00:00 | Car0010 | User0123 | DRIVING UNDER THE INFLUENCE | IN-CAR SYSTEM CONJUNCTION | ... |
| ID2 | 2014/12/01 14:05:30 | Car0010 | User0123 | DRUG ABUSE VIOLATIONS | IN-CAR SYSTEM CONJUNCTION | ... |
| : | : | : | : | : | : | : |

FIG. 26

| VIDEO DATA ID | META INFORMATION | | | | | |
|---|---|---|---|---|---|---|
| | VIDEO POSITION INFORMATION | Car ID | Officer ID | INCIDENT CATEGORY | VIDEO RECORDING STARTING FACTOR | OTHER INFORMATION |
| ID11 | 2014/11/01 12:00:00 | Car1010 | User1123 | DRIVING UNDER THE INFLUENCE | WCAM CONJUNCTION | ... |
| ID12 | 2014/11/01 14:05:30 | Car1010 | User1123 | STOLEN PROPERTY | WCAM CONJUNCTION | ... |
| : | : | : | : | : | : | : |

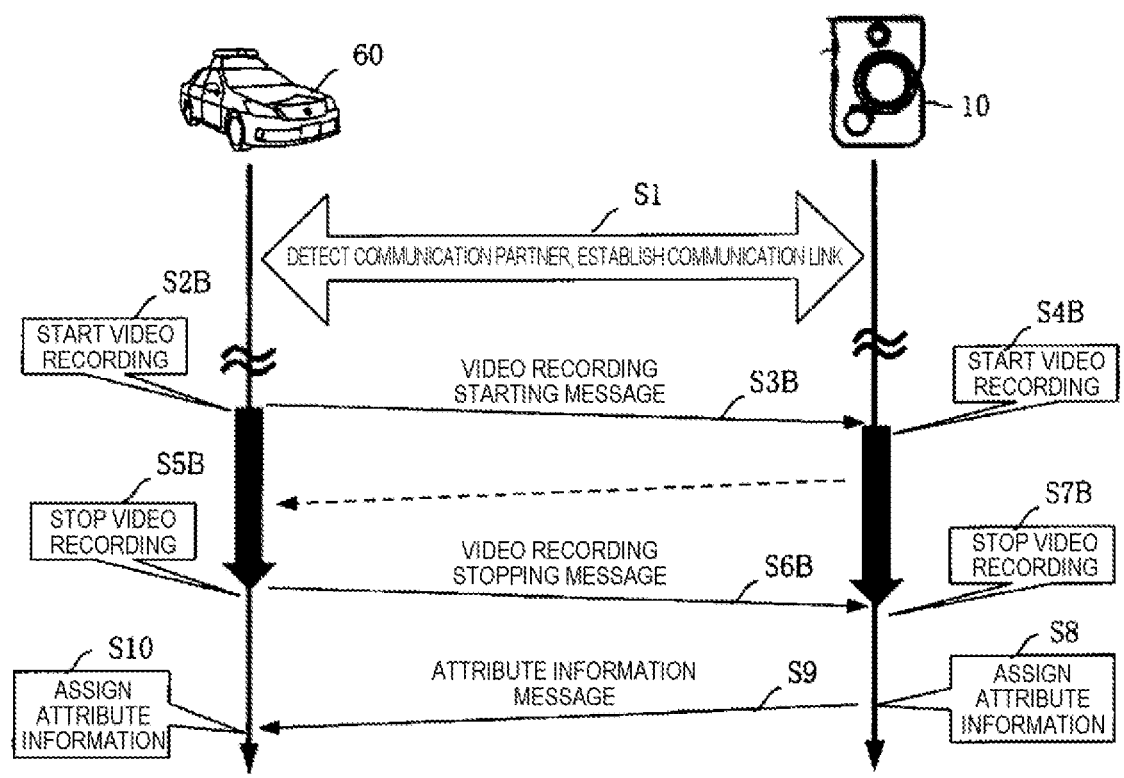

WEARABLE CAMERA SYSTEM, AND VIDEO RECORDING CONTROL METHOD FOR WEARABLE CAMERA SYSTEM

BACKGROUND OF THE INVENTION

1. Field of the Invention

The present invention relates to a wearable camera system, and a video recording control method for the wearable camera system. The present invention relates to a wearable camera system including an image capturing device, for example, which can be mounted on a human body or worn clothes, and a video recording control method therefor.

2. Description of the Related Art

In recent years, introduction of a wearable camera which is mounted on a police officer or a security guard and is used in order to support duties of the police officer or the security guard, for example, has been taken into consideration.

As an example of the related art using the wearable camera, Japanese Patent Unexamined Publication No. 2006-148842 discloses a wearable monitoring camera system, for example. The wearable monitoring camera system has a configuration in which a video signal and an audio signal from body-mounted CCD camera means and microphone means, and a date and time information signal from built-in clock means are encoded by encode server means which is accommodated in body-mounted pouch means, and the date and time information converted into character information can be recorded by being superimposed on a captured video.

In this system, for example, in a case where a police officer or a security guard wears and uses a wearable camera, it is expected that recording of video data (video signal) is started by the police officer or the security guard pressing a recording button.

However, if the police officer or the security guard attempts to handle an emergency situation, there is a possibility of being incapable of performing a video recording start operation, and thus a state may occur in which an important scene for the future incident investigation is not recorded (recording omission). Paying attention to the video recording start operation may decrease the attention of the police officer or the security guard to the emergency situation. Also in a case where an in-car camera is mounted in a patrol car or the like and can perform video recording, the video recording start operation may not be performed and thus recording omission may occur in the same manner.

SUMMARY OF THE INVENTION

The present invention has been made in consideration of the above circumstances, and an object thereof is to provide a wearable camera system and a video recording control method therefor capable of improving convenience in treating video data captured by a wearable camera or an in-car camera and thus of reducing recording omission of the video data.

A wearable camera system of the present invention includes a wearable camera that can be mounted on a user; an in-car recorder that is equipped in a vehicle in which the user rides; and an in-car camera which is equipped in the vehicle. The in-car camera includes a first capture that captures videos. The in-car recorder includes a first communicator that performs communication with the wearable camera as a communication partner; and a first recorder that records first video data captured by the in-car camera. The wearable camera includes a second capture that captures videos; a second communicator that performs communication with the in-car recorder as a communication partner; and a second recorder that records second video data captured by the second capture. One of the in-car recorder and the wearable camera transmits video recording starting information including information indicating that video recording has been started to the other of the in-car recorder and the wearable camera when one of the in-car recorder and the wearable camera starts the video recording. The other of the in-car recorder and the wearable camera starts video recording after the video recording starting information is received.

A video recording control method of the present invention is a video recording control method for a wearable camera system including a wearable camera that can be mounted on a user; an in-car recorder that is equipped in a vehicle in which the user rides; and an in-car camera which is equipped in the vehicle, the method including causing the in-car camera to capture videos and causing the wearable camera to capture videos; causing the in-car recorder to record first video data captured by the in-car camera and causing the wearable camera to record second video data captured by the wearable camera; and performing communication between the in-car recorder and the wearable camera. In the recording of the videos, video recording is started by one of the in-car recorder and the wearable camera, and in the performing of communication, one of the in-car recorder and the wearable camera transmits video recording starting information including information indicating that video recording has been started to the other of the in-car recorder and the wearable camera when one of the in-car recorder and the wearable camera starts the video recording. In the recording of the videos, the other of the in-car recorder and the wearable camera starts video recording after the video recording starting information is received.

According to the present invention, it is possible to improve convenience of handling video data captured by a wearable camera or an in-car camera and thus to reduce recording omission of the video data.

BRIEF DESCRIPTION OF DRAWINGS

FIG. 12 is a schematic diagram illustrating an example of a data structure of a recorded video list held in the wearable camera according to the exemplary embodiment of the present invention;

FIG. 13 is a schematic diagram illustrating an example of a data structure of a recorded video list held in the in-car recorder according to the exemplary embodiment of the present invention;

FIG. 18 is a schematic diagram illustrating an example of a management table in which information regarding the specific wearable camera derived as a communication partner is held according to the second exemplary embodiment of the present invention;

FIG. 21 is a sequence diagram illustrating an operation example of the wearable camera system in a case where an in-car recorder starts video recording through WCAM conjunction according to the second exemplary embodiment of the present invention;

FIG. 22 is a schematic diagram illustrating an example of attribute information in a wearable camera according to a third exemplary embodiment of the present invention;

FIG. 23 is a schematic diagram illustrating an example of attribute information in an in-car recorder according to the third exemplary embodiment of the present invention;

FIG. 25 is a schematic diagram illustrating an example of a data structure of a recorded video list held in the wearable camera according to the third exemplary embodiment of the present invention;

FIG. 26 is a schematic diagram illustrating an example of a data structure of a recorded video list held in the in-car recorder according to the third exemplary embodiment of the present invention;

FIG. 30 is a sequence diagram illustrating a fourth example of an attribute information assigning procedure in the wearable camera system according to the third exemplary embodiment.

DETAILED DESCRIPTION OF THE PREFERRED EMBODIMENTS

Hereinafter, exemplary embodiments of the present invention will be described with reference to the drawings.

Figure 1:
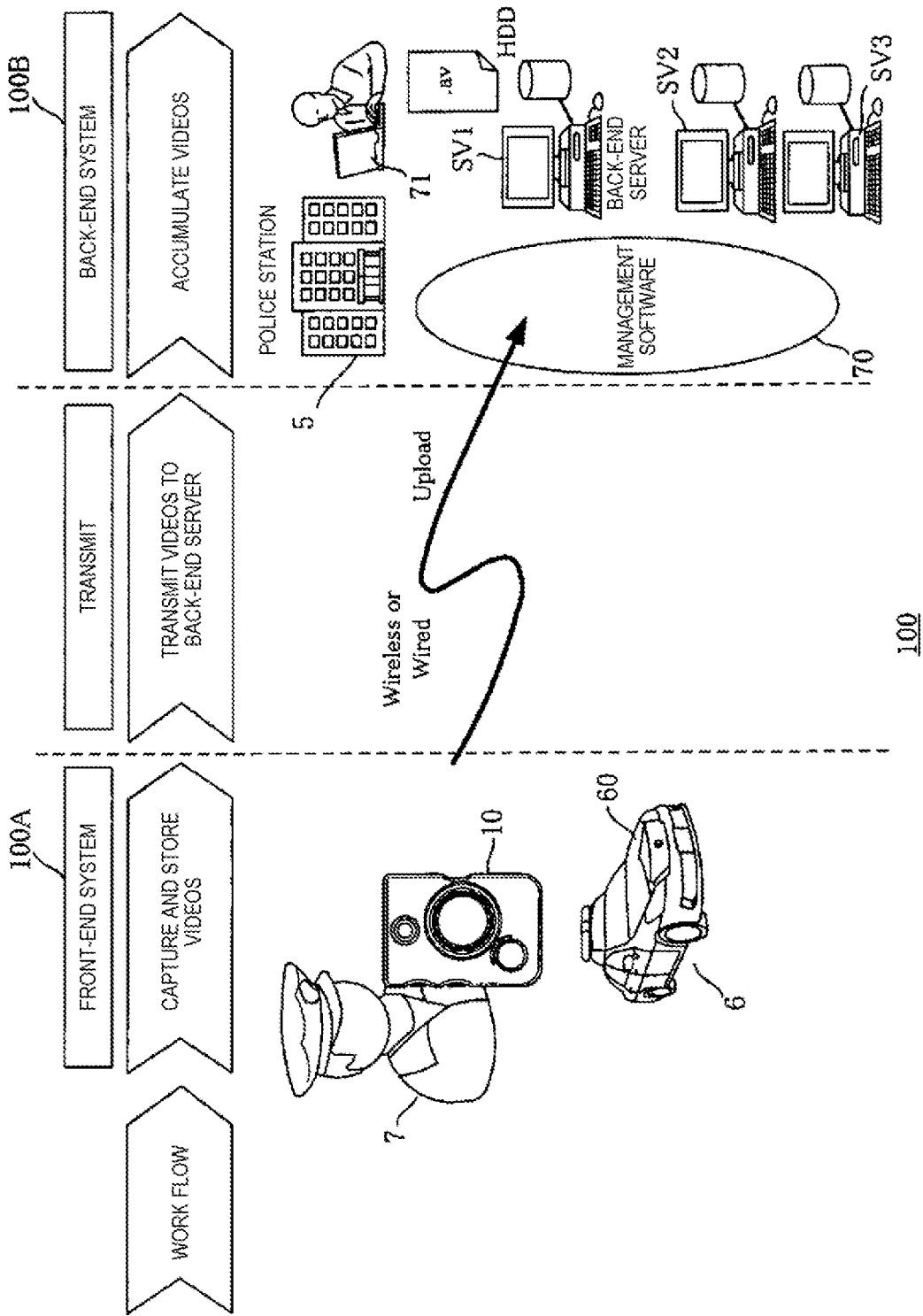
FIG. 1 is an explanatory diagram regarding an overview of a wearable camera system and usage of video data captured by a wearable camera, according to an exemplary embodiment of the present invention.
Figure 2:
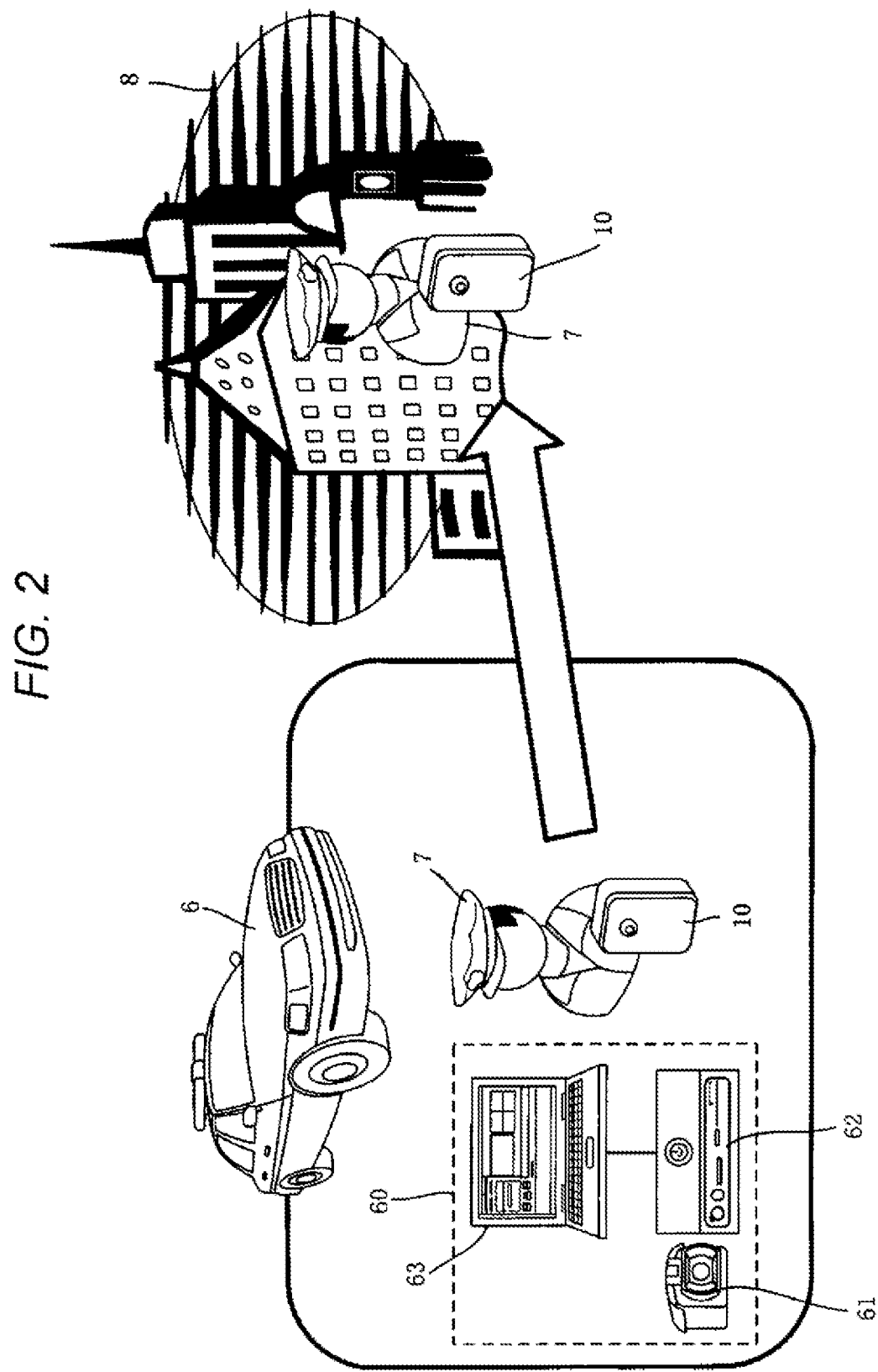
FIG. 2 is a schematic diagram illustrating that a police officer rides in a patrol car and goes to a scene in the exemplary embodiment of the present invention.

FIG. 1 is an explanatory diagram regarding an overview of wearable camera system 100 and usage of video data captured by wearable camera 10 according to the present exemplary embodiment. FIG. 2 is a schematic diagram illustrating that police officer 7 rides in patrol car 6 and goes to scene 8.

Wearable camera 10 of the present exemplary embodiment is an image capturing device which can be mounted on the body or worn clothes of a user (for example, police officer 7 or a security guard). Wearable camera 10 has a communication function of performing communication with in-car system 60 equipped in a car and servers (back-end servers) SV1, SV2 and SV3 in a user's organization.

In wearable camera system 100, front-end system 100A is configured to include wearable camera 10, and in-car system 60, and back-end system 100B is configured to include management software 70 on a network, in-station PC 71 which is a PC used in police station 5, and servers SV1, SV2, and SV3. Management software 70 is executed by, for example, in-station PC 71 or servers SV1 to SV3.

Here, a description will be made assuming a case of being used in police station 5, as an example of the wearable camera system 100. In this case, police officer 7 performs image capturing by using wearable camera 10. For example, captured video data is transmitted to back-end system 100B in police station 5 and is accumulated therein. In wearable camera 10, a user is not limited to police officer 7. Wearable camera 10 may also be used in other various places of work (for example, a security company). In the present exemplary embodiment, police officer 7 will be mainly exemplified as a user.

Front-end system 100A includes wearable camera 10 which can be mounted on police officer 7 who is dispatched to the front lines of scene 8, and in-car system 60 which is installed in patrol car 6.

In-car system 60 includes in-car camera 61, in-car recorder 62, in-car PC 63, a communication unit, and the like, thereby configuring an in-car camera system, a video management system, and the like (refer to FIG. 2).

In-car camera 61 includes a capture which is installed at a predetermined position of patrol car 6 and captures videos of the periphery of patrol car 6 at all times or at predetermined timings. In-car camera 61 includes, for example, a front camera which captures an image of the front side of patrol car 6, and a back seat camera which captures an image of a back seat (for example, a seat which a suspect is seated) in patrol car 6. Video data captured by in-car camera 61 is recorded, for example, and is then accumulated in in-car recorder 62. A plurality of in-car cameras 61 may be installed.

A microphone which collects sound inside and outside of patrol car 6 may be provided in the front camera or the back seat camera. In this case, sound output by police officer 7 or a suspect in patrol car 6 can be collected (recorded).

In-car recorder 62 accumulates the video data captured by in-car camera 61. In-car recorder 62 may assign meta information such as attribute information to the video data captured by in-car camera 61 and manage the video data.

In-car recorder 62 may acquire video data captured by wearable camera 10 and accumulate the video data. Meta information such as attribute information may be assigned to acquired or accumulated video data.

In-car PC 63 may be not only a PC which is equipped in patrol car 6 in a fixed manner but also a wireless communication device such as a portable PC, a smart phone, a mobile phone, a tablet terminal, or a personal digital assistant (PDA) portable to the outside of patrol car 6.

In-car PC 63 executes the management software so as to cause in-car system 60 to cooperate with wearable camera 10. User interfaces (UIs) (for example, an operator, a display, and a sound output) of in-car PC 63 may be used as UIs for operating in-car recorder 62.

When police officer 7 is dispatched from police station 5 to carry out a predetermined duty (for example, patrols), the police officer wears wearable camera 10, for example, rides in patrol car 6 equipped with in-car system 60, and goes to scene 8 (refer to FIG. 2).

In front-end system 100A, for example, videos of scene 8 at which patrol car 6 has arrived are captured by in-car camera 61 of in-car system 60, and police officer 7 steps out of patrol car 6. Then, more detailed videos of scene 8 are captured by wearable camera 10.

Video data such as moving images and still images captured by wearable camera 10 are stored in, for example, a memory of wearable camera 10, or a memory of in-car recorder 62 or in-car PC 63 of in-car system 60.

Wearable camera 10 transmits (uploads) various pieces of data including the video data captured by wearable camera 10 from the memory or the like of wearable camera 10 to back-end system 100B.

In-car system 60 (for example, in-car recorder 62) transmits (uploads) various pieces of data including the video data captured by in-car camera 61 from the memory or the like of in-car system 60 to back-end system 100B.

Transmission of the data to back-end system 100B is performed through connection using wireless communication from scene 8, or is performed using wired communication or wireless communication, or in a manual manner (for example, through a hand-carried storage medium) when the police officer returns to police station 5 after completing the patrols.

Back-end system 100B includes servers SV1 to SV3 which are installed in police station 5 or other places, management software 70 for performing communication with front-end system 100A, and in-station PC 71.

Servers SV1 to SV3 are provided with a storage such as a hard disk drive (HDD) or a solid state driver (SSD) inside or outside servers SV1 to SV3. Servers SV1 to SV3 accumulate video data and other data transmitted from front-end system 100A therein. Servers SV1 to SV3 receive video data transmitted from, for example, wearable camera 10 or in-car system 60 (for example, in-car recorder 62), and preserves the video data in the storage such as an HDD.

The video data accumulated in back-end system 100B is used for handling or investigation of an incident by a person in charge in the relevant department of police station 5, for example. As necessary, the video data is copied into a predetermined storage medium (for example, a digital versatile disk (DVD)) and is submitted to a predetermined scene (for example, trial) as evidence. In the present exemplary embodiment, the evidential videos of scene 8 can be more exactly acquired and preserved by using wearable camera 10 worn by police officer 7.

In order for police officer 7 to be dispatched to scene 8 from police station 5 and to use wearable camera 10, identification information (for example, an officer ID) of police officer 7, identification information (for example, a camera ID) of wearable camera 10 used by police officer 7, identification information (for example, a car ID) of patrol car 6 used by police officer 7, and the like are set and registered by using in-station PC 71 or the like. Consequently, when, by which police officer, and with which camera the video data accumulated in servers SV1 to SV3 was captured can be clearly discriminated.

The setting and registration of police officer 7 or wearable camera 10 are performed, for example, by a person in charge in police station 5 or police officer 7 who is being dispatched operating the operator of in-station PC 71, and by PC 71 executing management software 70. In the setting and registration, information other than the above-described officer ID, camera ID, and car ID may be input via the operator of in-station PC 71.

In other words, management software 70 includes, for example, an application for managing members of police officers 7, an application for managing allocation of patrol cars 6, or the like, and an application for managing take-out of wearable camera 10. Management software 70 includes, for example, an application for searching for and extracting specific video data from a plurality of items of video data accumulated in servers SV1 to SV3 on the basis of attribute information.

When police officer 7 rides in patrol car 6, police officer 7 can log in to in-car system 60. When the login is performed, for example, the officer ID, the camera ID, and other information are input by operating the operator of in-car PC 63 in the same manner as in the setting and registration in police station 5. The input officer ID, camera ID, and other information are held in, for example, in-car recorder 62.

If police officer 7 logs in to in-car system 60, police officer 7 is allowed to use in-car system 60. Cooperation between in-car system 60 and wearable camera 10 carried by police officer 7 may be possible after the login is performed. For example, video data captured by wearable camera 10 may be transmitted to in-car system 60 (for example, in-car recorder 62), police officer 7 may recognize the video data via in-car PC 63, and in-car system 60 (for example, in-car recorder 62) may give various setting instructions to wearable camera 10.

Figure 3:
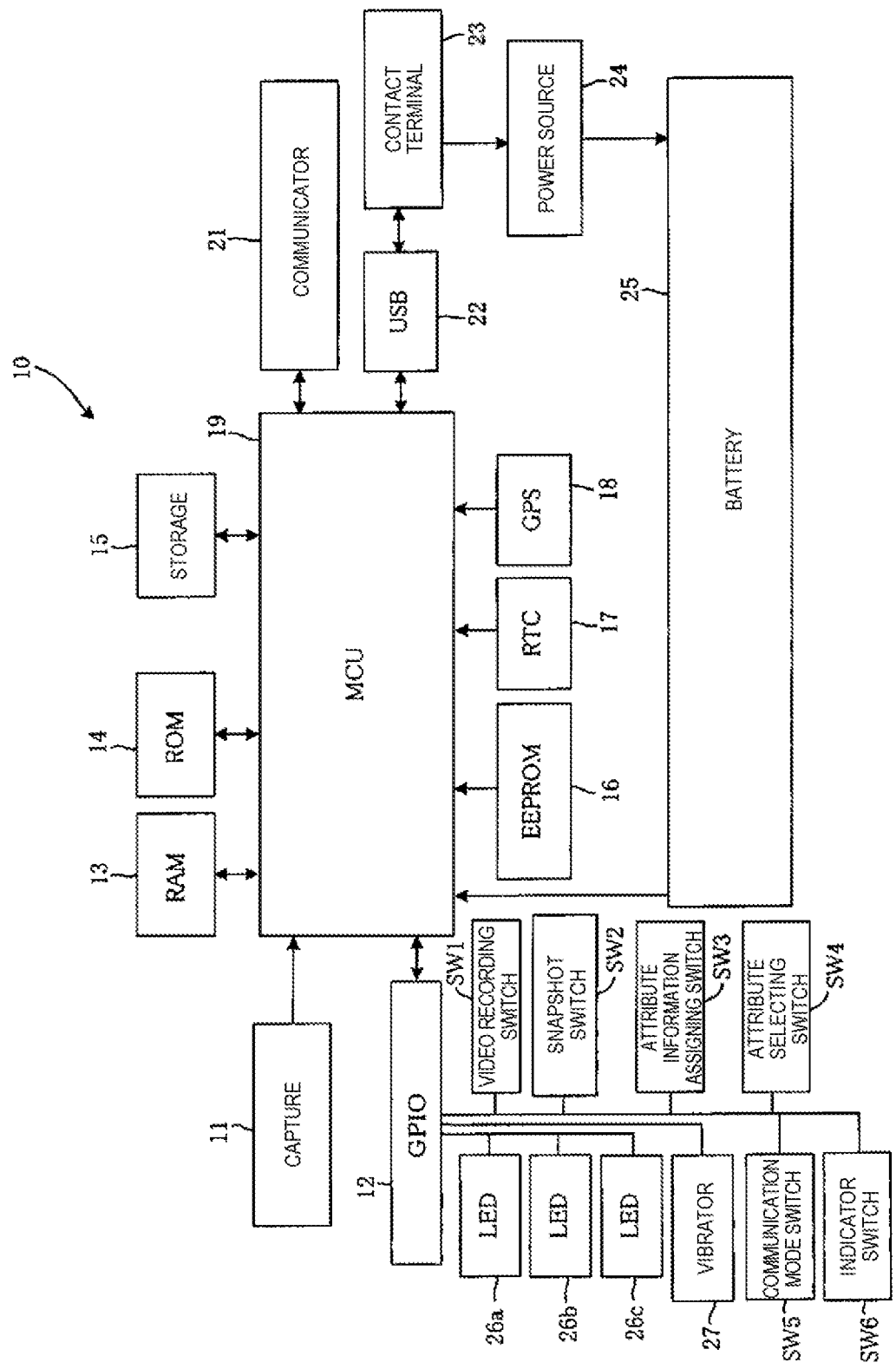
FIG. 3 is a block diagram illustrating an example of an internal configuration of the wearable camera according to the exemplary embodiment of the present invention.
Figure 4:
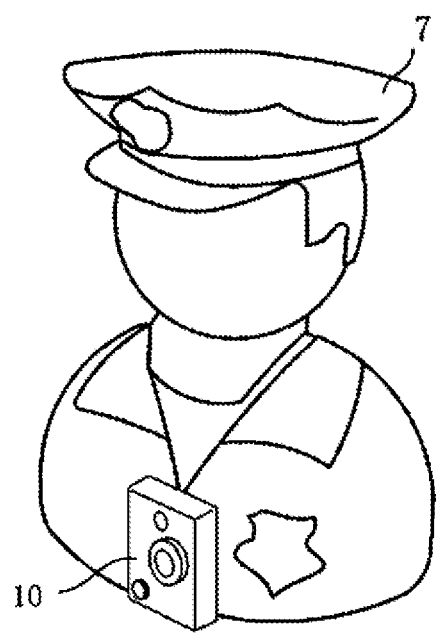
FIG. 4 is a diagram illustrating a state in which a user wears the wearable camera according to the exemplary embodiment of the present invention.
Figure 5:
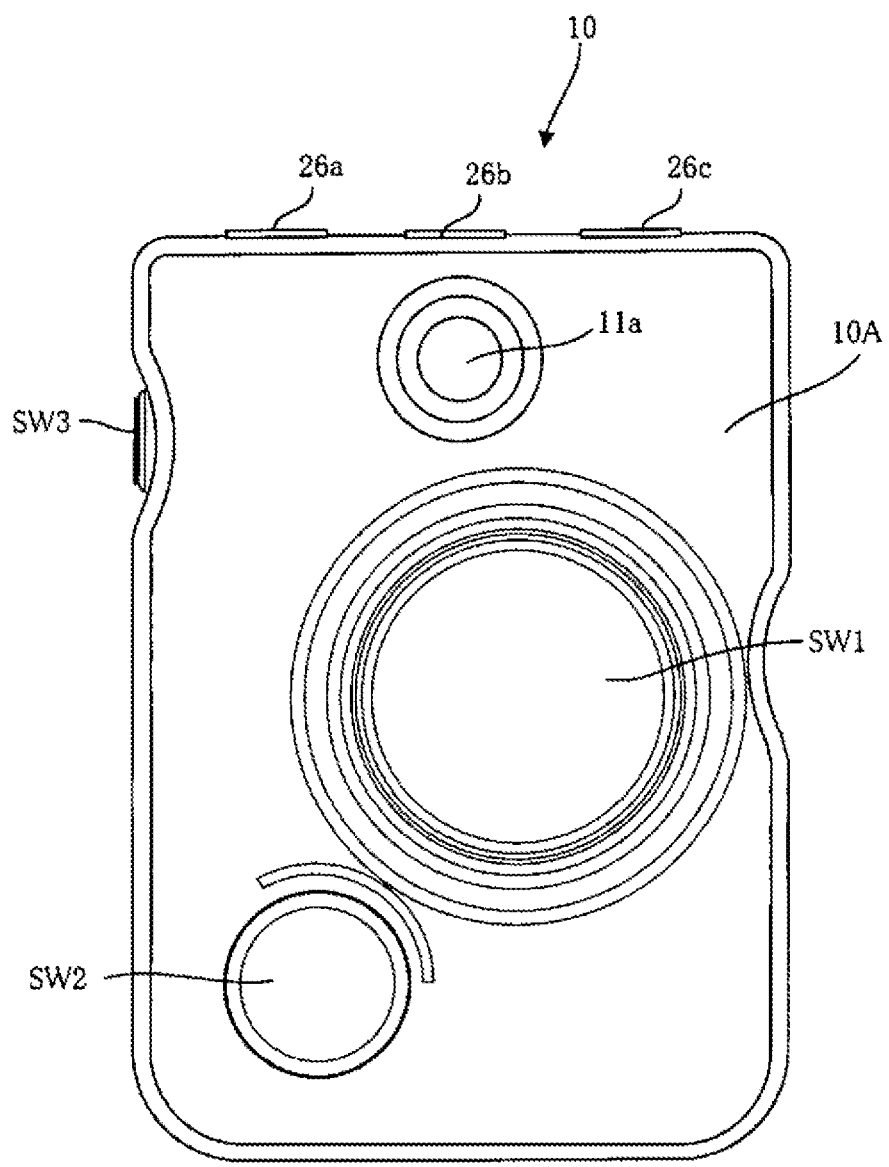
FIG. 5 is a front view illustrating an example of the appearance of the wearable camera according to the exemplary embodiment of the present invention.
Figure 6:
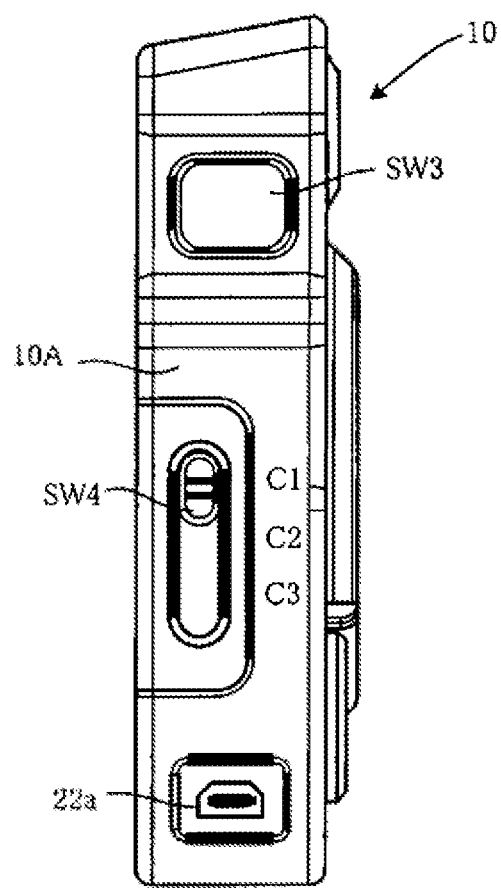
FIG. 6 is a left side view illustrating an example of the appearance of the wearable camera according to the exemplary embodiment of the present invention.
Figure 7:
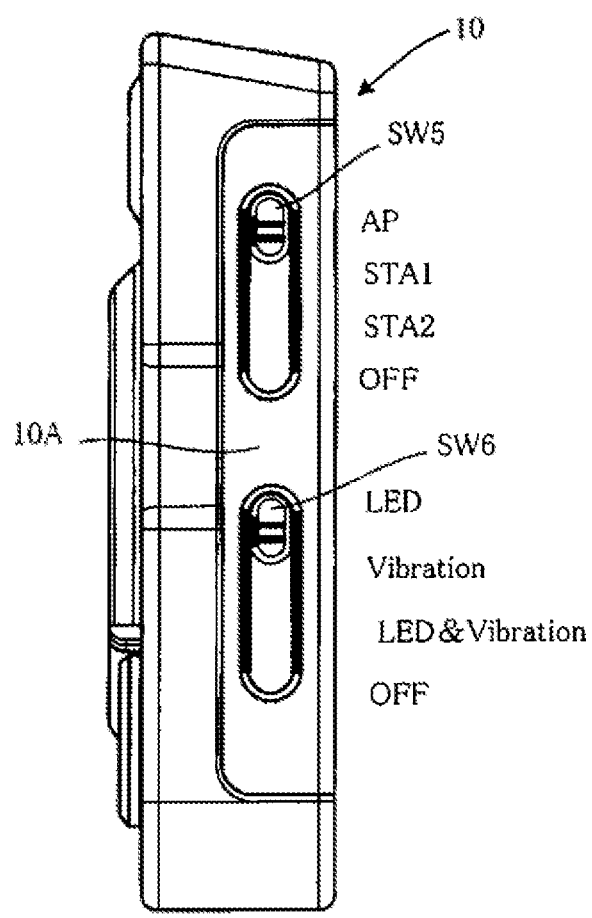
FIG. 7 is a right side view illustrating an example of the appearance of the wearable camera according to the exemplary embodiment of the present invention.

FIG. 3 is a block diagram illustrating an example of an internal configuration of wearable camera 10. FIG. 4 is a diagram illustrating a state where police officer 7 wears wearable camera 10. FIG. 5 is a front view illustrating an example of the appearance of wearable camera 10. FIG. 6 is a left side view illustrating an example of the appearance of wearable camera 10. FIG. 7 is a right side view illustrating an example of the appearance of wearable camera 10.

As illustrated in FIG. 3, wearable camera 10 includes capture 11, general purpose input/output (GPIO) 12, random access memory (RAM) 13, read only memory (ROM) 14, and storage 15. Wearable camera 10 includes electrically erasable programmable read-only memory (EEPROM) 16, real time clock (RTC) 17, and global positioning system (GPS) 18. Wearable camera 10 includes micro controller unit (MCU) 19, communicator 21, universal serial bus (USB) 22, contact terminal 23, power source 24, and battery 25.

As examples of operation input sections, wearable camera 10 includes video recording switch SW1, snapshot switch SW2, attribute information assigning switch SW3, attribute selecting switch SW4, communication mode switch SW5, and indicator switch SW6.

As examples of state displays, wearable camera 10 includes light emitting diodes (LEDs) 26a, 26b, and 26c, and vibrator 27.

Capture 11 includes, for example, image capturing lens 11a (refer to FIG. 5) and a solid-state imaging device such as a charge coupled device-type (CCD) image sensor or a complementary metal oxide semiconductor-type (CMOS) image sensor. Capture 11 outputs video data of a subject obtained through image capturing to MCU 19.

GPIO 12 is a parallel interface through which signals are input and output between video recording switch SW1, snapshot switch SW2, attribute information assigning switch SW3, attribute selecting switch SW4, communication mode switch SW5, indicator switch SW6, LEDs 26a to 26c, and vibrator 27; and MCU 19. GPIO 12 is connected to, for example, various sensors (for example, an acceleration sensor).

RAM 13 is a work memory which is used when MCU 19 operates. ROM 14 is a memory in which programs and data for controlling MCU 19 are stored in advance.

Storage 15 is constituted of a storage medium such as an SD memory, and stores video data captured and obtained by capture 11. When the SD memory is used as storage 15, the memory is attachable to and detachable from the casing main body of wearable camera 10.

EEPROM 16 stores, for example, identification information (a serial number as a camera ID) which identifies wearable camera 10, and other setting information. The other setting information includes, for example, login information (for example, a car ID and an officer ID) which is obtained through setting and registration in in-station PC 71 or by logging in to in-car recorder 62, and correspondence information indicating correspondence between a state of attribute selecting switch SW4 and attribute information.

RTC 17 counts current time information and outputs the information to MCU 19.

GPS 18 receives current positional information of wearable camera 10 and current time information from a GPS transmitter and outputs the information to MCU 19. The time information is used to correct system time of the wearable camera.

MCU 19 functions as a controller so as to perform, for example, a control process for collectively controlling the entire operations of the respective units of wearable camera 10, data input and output processes among the respective units of wearable camera 10, a data calculation (computation) process, and a data storing process. MCU 19 operates in accordance with the program and data stored in ROM 14. MCU 19 uses, for example, RAM 13 during an operation, acquires current time information from RTC 17, and acquires current positional information from GPS 18.

For example, communicator 21 defines the connection between communicator 21 and MCU 19 in a physical layer which is a first layer in an open systems interconnection (OSI) reference model. Communicator 21 performs wireless communication (for example, Wi-Fi (registered trademark)) through a wireless LAN (W-LAN), for example, in accordance with the definition thereof. Communicator 21 may perform wireless communication such as near field communication (NFC) or Bluetooth (registered trademark).

USB 22 is a serial bus which allows wearable camera 10 to be connected to, for example, in-car system 60, or in-station PC 71 in police station 5.

Contact terminal 23 is a terminal for being electrically connected with a cradle, an external adaptor, or the like. Contact terminal 23 is connected to MCU 19 via USB 22, and is connected to power source 24. Charging of wearable camera 10 and communication of data including video data can be performed via contact terminal 23.

For example, contact terminal 23 is provided with "charge terminal V+", "CON.DET terminal", "data terminals D− and D+", and "a ground terminal". CON.DET terminal is a terminal for detecting a voltage and a voltage change. Data terminals D− and D+ are terminals for transmitting video data or the like captured by wearable camera 10 to an external PC via, for example, a USB connector terminal.

Contact terminal 23 is connected to a cradle or a connector of an external adaptor, and thus data communication can be performed between wearable camera 10 and an external apparatus.

Power source 24 supplies source power supplied from a cradle or an external adaptor via, for example, contact terminal 23, to battery 25, thereby charging battery 25. Battery 25 is constituted of a rechargeable secondary battery and supplies the source power to each of the units of wearable camera 10.

Video recording switch SW1 is, for example, a push button switch used to input an operational instruction for performing starting or stoppage of video recording (capturing of a moving image) through a pressing operation performed by police officer 7.

Snapshot switch SW2 is, for example, a push button switch used to input an operational instruction for performing capturing of a still image through a pressing operation performed by police officer 7.

Attribute information assigning switch SW3 is, for example, a push button switch used to input an operational instruction for assigning attribute information to video data through a pressing operation performed by police officer 7.

Attribute selecting switch SW4 is, for example, a slide switch used to input an operational instruction for selecting an attribute to be assigned to video data.

Communication mode switch SW5 is, for example, a slide switch used to input an operational instruction for setting a communication mode between wearable camera 10 and an external apparatus.

Indicator switch SW6 is, for example, a slide switch used to input an operational instruction for setting an operation state display mode using LEDs 26a to 26c and vibrator 27.

Video recording switch SW1, snapshot switch SW2, attribute information assigning switch SW3, and attribute selecting switch SW4 are configured to be able to be easily operated even in an emergency situation. Each of switches SW1 to SW6 is not limited to the above-described forms. The switch may be an operation input device in other forms allowing a user to input an operational instruction.

LED 26a is a display indicating a power supply state (ON-OFF state) of wearable camera 10 and a state of battery 25.

LED 26b is a display indicating a state of the image capturing operation (video recording state) of wearable camera 10.

LED 26c is a display indicating a state of the communication mode of wearable camera 10.

MCU 19 detects an input operation on each of the switches such as video recording switch SW1, snapshot switch SW2, attribute information assigning switch SW3, attribute selecting switch SW4, communication mode switch SW5, and indicator switch SW6, and performs a process related to an input operation on the switch.

When an input operation on video recording switch SW1 is detected, MCU 19 controls starting or stoppage of the image capturing operation in capture 11, and preserves video data obtained from capture 11 in storage 15 as video data of a moving image.

When an input operation on snapshot switch SW2 is detected, MCU 19 preserves video data obtained by capture 11 when snapshot switch SW2 is operated in storage 15 as video data of a still image.

When an input operation on attribute information assigning switch SW3 is detected, MCU 19 assigns attribute information which has been set in advance to the video data, and preserves the information in storage 15 by associating the information with the video data. In this case, association information indicating a correspondence relationship between the state of attribute selecting switch SW4 and predetermined attribute information is held in EEPROM 16, and MCU 19 detects the state of attribute selecting switch SW4, so as to assign attribute information corresponding to the setting for attribute selecting switch SW4.

MCU 19 detects the state of communication mode switch SW5 and operates communicator 21 in accordance with a communication mode corresponding to the setting for communication mode switch SW5.

When a video recording operation starts, MCU 19 detects the state of indicator switch SW6 and notifies the outside of the state of the video recording operation through the LED display and/or vibrations of the vibrator, in accordance with the setting of indicator switch SW6.

As illustrated in FIG. 4, wearable camera 10 is used in a mounted state on worn clothes or the body of police officer 7, for example, the chest of police officer 7 so as to capture a video in a viewing field from a position close to the viewpoint of police officer 7. Police officer 7 captures a subject on the periphery by operating video recording switch SW1 in a state of wearing wearable camera 10.

As illustrated in FIG. 5, in wearable camera 10, image capturing lens 11a of capture 11, video recording switch SW1, and snapshot switch SW2 are provided on the front face of casing 10A having a substantially rectangular parallelepiped shape.

For example, video recording (capturing of a moving image) starts by pressing video recording switch SW1 an odd number of times, and the video recording ends by pressing the switch an even number of times.

Every time Snapshot switch SW2 is pressed, a still image at that moment is captured.

As illustrated in FIG. 6, attribute information assigning switch SW3, attribute selecting switch SW4, and USB connector 22a are provided on the left side of casing 10A of wearable camera 10 when viewed from the front side thereof. As police officer 7 performs a pressing operation on attribute information assigning switch SW3, attribute information corresponding to the setting state of attribute selecting switch SW4 is assigned to video data which is currently being recorded or video data which is recorded immediately before.

In the illustrated example, attribute selecting switch SW4 is a slide switch having contact point positions of three stages C1, C2, and C3. Police officer 7 selects and designates attribute information which has been allocated and set to each of stages C1 to C3.

A cable for being connected to an external apparatus through USB 22 is connected to USB connector 22a. Consequently, wearable camera 10 can be connected to in-car system 60, in-station PC 71 or the like in police station 5 so as to perform data communication.

As illustrated in FIG. 7, communication mode switch SW5 and indicator switch SW6 are provided on the right side of casing 10A of wearable camera 10 when viewed from the front side thereof.

In the illustrated example, communication mode switch SW5 is a slide switch having contact point positions of four stages AP, STA1, STA2, and OFF. The user selects and designates a communication mode of wearable camera 10.

AP is an access point mode. In this mode, wearable camera 10 operates as an access point for the wireless LAN and is connected to a portable terminal carried by police officer 7 in a wireless manner so that communication is performed between wearable camera 10 and the portable terminal.

In the access point mode, the portable terminal is connected to wearable camera 10, and can thus display a current live video obtained by wearable camera 10, reproduce recorded video data, display a captured still image, and display attribute information or meta information assigned to video data.

STA1 and STA2 are station modes. In these modes, communication is performed with an external apparatus as an access point when connection to the external apparatus is performed by using the wireless LAN. STA1 is a mode for connection to an access point in police station 5, STA2 is a mode for connection to in-car system 60, and different connection destination information pieces are respectively set therefor.

In the station mode, wearable camera 10 can perform various settings and can transmit (upload) the recorded video data preserved in wearable camera 10 to in-car system 60, in-station PC 71 in police station 5, or servers SV1 to SV3.

OFF is a mode for turning off a communication operation using the wireless LAN. In this mode, the wireless LAN is not in use.

In the illustrated example, indicator switch SW6 is a slide switch having contact point positions of four stages of LED, Vibration, LED & Vibration, and OFF. Police officer 7 selects and designates the notification mode of wearable camera 10.

LED is a mode for displaying an operation state of wearable camera 10 in video-recording, for example, through LEDs 26a to 26c.

Vibration is a mode for performing a notification of an operation state of wearable camera 10 through vibration of vibrator 27.

LED & Vibration is a mode for issuing notification of an operation state of wearable camera 10 through the displaying of LEDs 26a to 26c and vibration of vibrator 27.

OFF is a mode for turning off a notification operation of an operation state.

As illustrated in FIG. 4, LEDs 26a to 26c are disposed on the top face when viewed from the front side of casing 10A of wearable camera 10. Consequently, LEDs 26a to 26c can be easily and visually recognized by police officer 7 in a state of wearing wearable camera 10. No one else may see LEDs 26a to 26c except for police officer 7.

Contact terminal 23 is provided on the bottom face of casing 10A of wearable camera 10 when viewed from the front side thereof.

Figure 8:
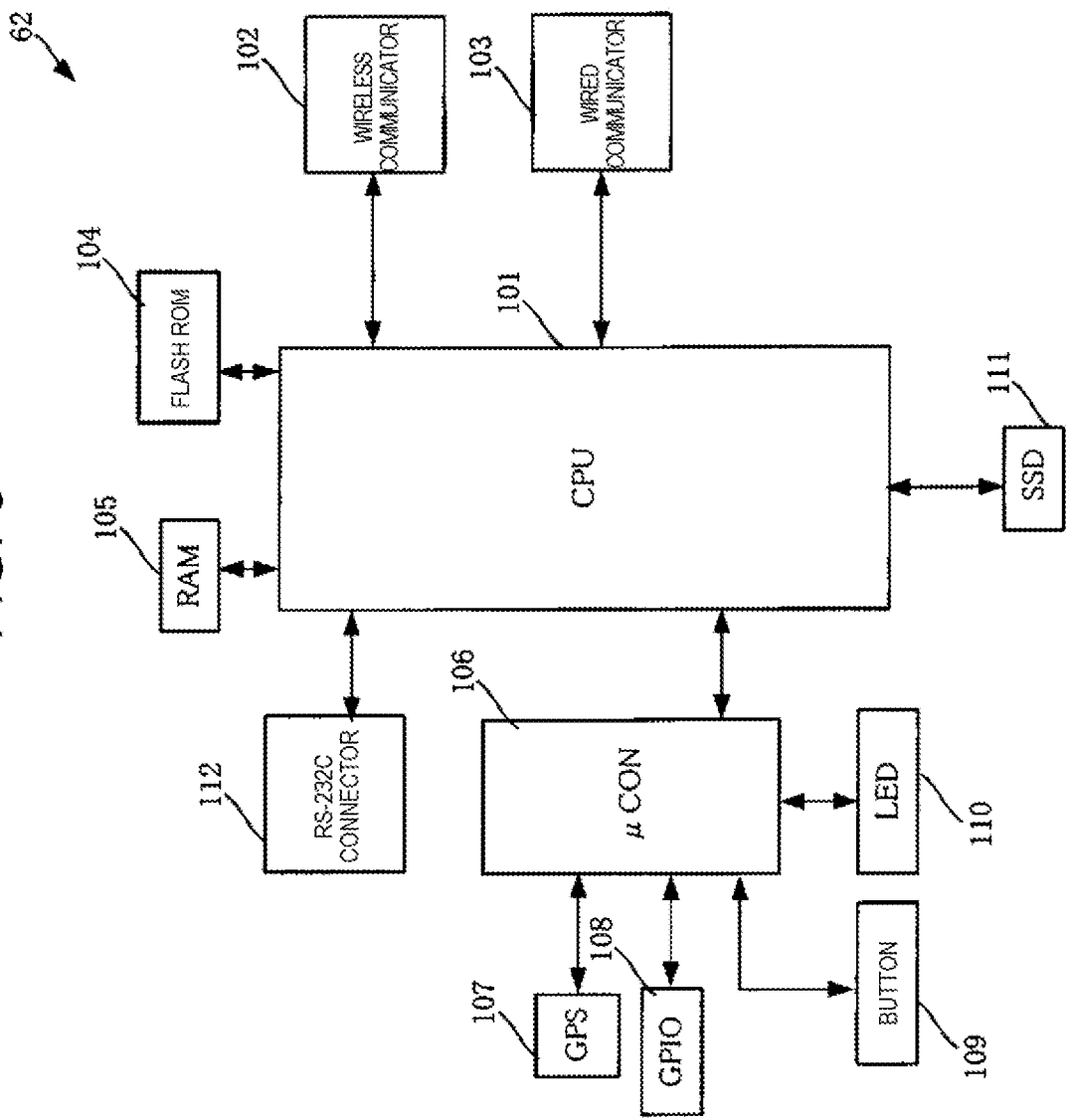
FIG. 8 is a block diagram illustrating an example of an internal configuration of an in-car recorder according to the exemplary embodiment of the present invention.

FIG. 8 is a block diagram illustrating an example of an internal configuration of in-car recorder 62. In-car recorder 62 is configured to include CPU 101, wireless communicator 102, wired communicator 103, flash ROM 104, RAM 105, μCON 106, GPS 107, GPIO 108, buttons 109, LED 110, and SSD 111.

CPU 101 performs, for example, a control process for collectively controlling the entire operations of the respective units of in-car recorder 62, data input and output processes with other units thereof, a data calculation (computation) process, and a data storing process.

Wireless communicator 102 performs wireless communication with an external device via a wireless line. The wireless communication includes, for example, a wireless local area network (LAN), near field communication (NFC), and Bluetooth (registered trademark). In the wireless LAN communication, communication is performed in accordance with, for example, the IEEE802.11n standard of Wi-Fi (registered trademark). CPU 101 and wireless communicator 102 are connected to each other via, for example, peripheral component interconnect (PCI) or a USB. Wireless communicator 102 performs communication with, for example, in-car camera 61, in-car PC 63, wearable camera 10, or in-station PC 71 or servers SV1 to SV3 in police station 5.

Wired communicator 103 performs wired communication with an external device via a wired line (for example, a wired LAN). Wired communicator 103 performs wired communication with, for example, in-car camera 61, in-car PC 63, wearable camera 10, or in-station PC 71 or servers SV1 to SV3 in police station 5.

Flash ROM 104 is, for example, a memory which stores programs and data for controlling CPU 101. Various pieces of setting information are held therein.

RAM 105 is, for example, a work memory used when CPU 101 operates. For example, a plurality of RAMs 105 are provided.

μCON 106 is one kind of microcomputer, and is connected to the respective units (for example, GPS 107, GPIO 108, buttons 109, and LED 110) related to an external interface so as to perform control regarding the external interface. μCON 106 is connected to CPU 101 via, for example, a universal asynchronous receiver/transmitter (UART).

GPS 107 receives, for example, current position information of in-car recorder 62 and current time information from a GPS transmitter, and outputs the information to CPU 101. The time information is used to correct system time of in-car recorder 62.

GPIO 108 is a parallel interface. Signals are input and output between an external device which is connected via GPIO 108, and MCU 19. For example, various sensors (for example, a speed sensor, an acceleration sensor, and a door opening/closing sensor) are connected to GPIO 108.

Buttons 109 include, for example, a video recording button for starting or stopping recording of video data which is captured by in-car camera 61, and an assigning button for assigning attribute information or meta information to the video data captured by in-car camera 61.

LED 110 indicates, for example, a power supply state (ON-OFF state) of in-car recorder 62, a video recording state, a state of in-car recorder 62 being connected to the LAN, and a usage state of the LAN connected to in-car recorder 62, through lighting, putting-out, blinking, and the like.

SSD 111 accumulates, for example, video data captured and recorded by in-car camera 61. SSD 111 may accumulate video data captured and recorded by wearable camera 10. SSD 111 may accumulate data other than video data. SSD 111 is connected to CPU 101 via serial ATA (SATA). SSD 111 may be provided in a plurality. Storages (for example, an HDD) other than SSD 111 may be provided.

Figure 9:
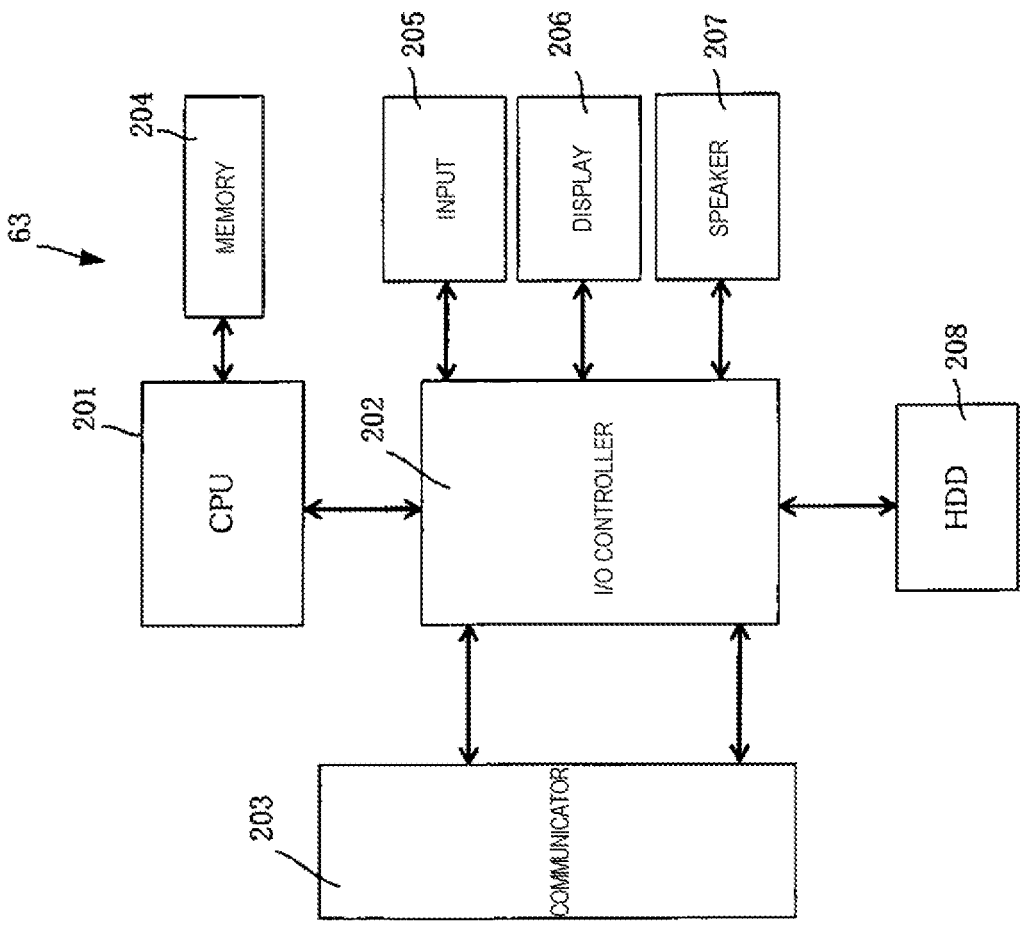
FIG. 9 is a block diagram illustrating an example of an internal configuration of an in-car PC according to the exemplary embodiment of the present invention.

FIG. 9 is a block diagram illustrating an example of an internal configuration of in-car PC 63. In-car PC 63 is configured to include CPU 201, input/output (I/O) controller 202, communicator 203, memory 204, input 205, display 206, speaker 207, and HDD 208. In-car PC 63 can perform communication with wearable camera 10 and in-car recorder 62, and can also perform communication with servers SV1 to SV3 of back-end system 100B or in-station PC 71.

CPU 201 performs, for example, a control process for collectively controlling the entire operations of the respective units of in-car PC 63, data input and output processes with other units thereof via I/O controller 202, a data calculation (computation) process, and a data storing process.

CPU 201 authenticates whether or not police officer 7 can log in to in-car system 60 through an input operation performed by police officer 7 on a login screen to in-car system 60, displayed on display 206, for example. The input operation performed by police officer 7 is an operation of inputting, for example, an officer ID and a password. Various pieces of information regarding police officer 7 who is a target to be allowed to log in are preserved in, for example, memory 204 in advance. CPU 201 determines whether or not police officer 7 can log in to in-car system 60 by using the information regarding a target to be allowed to log in, preserved in memory 204 in advance.

Regarding the login, login to in-car system 60 may be performed by using in-car PC 63, and login to an application which is installed in in-car PC 63 and is used to operate in-car system 60 may be performed.

I/O controller 202 performs control regarding inputting and outputting of data between CPU 201 and the respective units (for example, communicator 203, input 205, display 206, and speaker 207) of in-car PC 63, so as to perform relay of data from CPU 201 and relay of data to CPU 201. I/O controller 202 may be configured integrally with CPU 201.

Communicator 203 performs wired or wireless communication with, for example, in-car recorder 62, wearable camera 10 worn by police officer 7, or back-end system 100B side.

In a case where police officer 7 is logging in to in-car system 60, communicator 203 transmits the login information preserved in memory 204 to wearable camera 10 so that the login information is copied. In a case where police officer 7 is not logging in to in-car system 60, communicator 203 does not transmit the login information to wearable camera 10.

The login information includes, for example, an officer ID for identifying police officer 7, a camera ID for identifying wearable camera 10, and a car ID for identifying patrol car 6 which is used.

Memory 204 is configured by using, for example, a RAM, a ROM, or a nonvolatile or volatile semiconductor memory, functions as a work memory when CPU 201 operates, and preserves a predetermined program and data for operating CPU 201. Memory 204 preserves, for example, login information regarding police officer 7 who is allowed to log in to in-car system 60.

Input 205 is a UI for notifying CPU 201 of an input operation from police officer 7 via I/O controller 202, and is a pointing device such as a mouse or a keyboard. Input 205 may be configured by using, for example, a touch panel or a touch pad which is disposed to correspond to a screen of display 206 and is operable with the finger of police officer 7 or a stylus pen.

Input 205 allows, for example, login information for logging in to in-car system 60 to be input.

Display 206 is configured by using, for example, a liquid crystal display (LCD) or an organic electroluminescence (EL) display, and displays various pieces of information. For example, in a case where video data captured (recorded) by wearable camera 10 is input in response to an input operation from police officer 7, display 206 displays videos included in the video data on its screen under the control of CPU 201.

For example, in a case where video data including sound, captured (recorded) by wearable camera 10 is input in response to an input operation from police officer 7, speaker 207 outputs the sound included in the video data under the control of CPU 201. Display 206 and speaker 207 may be configured separately from in-car PC 63.

HDD 208 stores, for example, various items of data and software (software programs). Specifically, HDD 208 preserves, for example, software for controlling or setting in-car recorder 62, and software for controlling or setting wearable camera 10. HDD 208 preserves, for example, video data which is captured by wearable camera 10 and is transmitted from wearable camera 10.

Next, a description will be made of assignment of attribute information to video data. In wearable camera system 100, a case is assumed in which video data recorded by wearable camera 10 is transmitted to and accumulated in servers SV1 to SV3, and is used. Similarly, a case is assumed in which video data captured by in-car camera 61 is recorded by in-car recorder 62 so as to be transmitted to and accumulated in servers SV1 to SV3, and is used.

In this case, for example, in-station PC 71 can extract and reproduce target video data from the accumulated items of video data in response to an operation performed by a police officer in police station 5 on the basis of some sort of attribute information associated with video data, such as the type of video content, police officer 7 which has performed image capturing, the date and time, and an image capturing location. At this time, attribute information correlated with the video data is used. As a result of the attribute information being assigned to the video data, it is easy to discriminate captured videos from each other, and thus it becomes easier to extract target video data.

Here, wearable camera 10 assigns classification information (Classify) indicating the type of video content as the attribute information, and the video data items can be individually sorted by the type. The classification information indicates an incident category regarding content of the video data. Assignment of the attribute information to the video data is also referred to as tagging or the like. The attribute information is not limited to the classification information, and includes all types of information regarding recorded video data. The classification information, which is the attribute information, may be arranged in hierarchical structure, or may be categorized in multiple systems differently classified.

As mentioned above, in-car recorder 62 can assign classification information (Classify) indicating the type of video content as the attribute information, and can individually sort the video data items by the type.

Figures 10, 11:
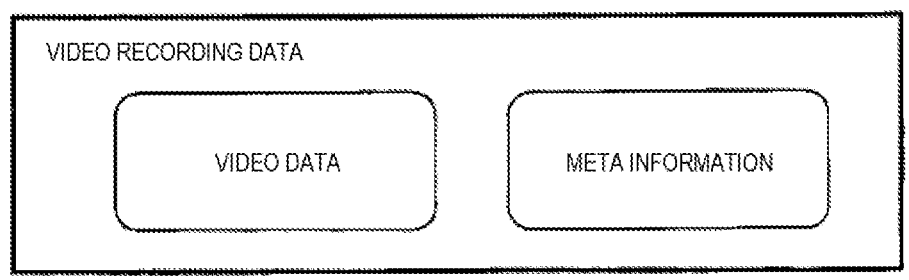
FIG. 10 is a schematic diagram illustrating an example of setting of attribute information according to the exemplary embodiment of the present invention.
FIG. 11 is a schematic diagram illustrating an example of a data structure of video recording data according to the exemplary embodiment of the present invention.

FIG. 10 is a schematic diagram illustrating an example of setting attribute information to attribute selecting switch SW4. The attribute information is selected by operating attribute selecting switch SW4, and is assigned by operating attribute information assigning switch SW3.

In a case of using wearable camera 10, as illustrated in FIG. 10, the attribute information is allocated and is set so as to respectively correspond to states (contact point positions) C1 to C3 of attribute selecting switch SW4. In the illustrated example, a case is assumed in which police officer 7 captures images of scene 8 (for example, an incident scene). Driving under the influence is allocated to C1; drug abuse violations are allocated to C2; and stolen property is allocated to C3.

In the allocation of the attribute information, MCU 19 of wearable camera 10 selects and sets attribute information which is frequently used by police officer 7 among a plurality of defined attribute information pieces. The set content of attribute information is stored in EEPROM 16 of wearable camera 10 as one of setting information pieces.

For example, communicator 203 acquires attribute information which is input via input 205 of in-car PC 63, and CPU 101 assigns the acquired attribute information to video data captured by in-car camera 61 by using in-car recorder 62. In the assignment of the attribute information using in-car recorder 62, the number of contact points is not fixed unlike in attribute selecting switch SW4, and thus more types of attribute information can be assigned.

FIG. 11 is a schematic diagram illustrating an example of a data structure of video recording data. The video recording data includes recorded video data and meta information corresponding to the video data. The meta information includes attribute information as will be described later. Video recording data which is captured and recorded by wearable camera 10 has the same format as that of video recording data which is captured by in-car camera 61 and is recorded by in-car recorder 62.

Next, a description will be made of a data structure of a recorded video list. A recorded video list associated with video data captured by wearable camera 10 is held in storage 15 of wearable camera 10. A recorded video list associated with video data captured by in-car camera 61 is held in SSD 111 of in-car recorder 62.

FIG. 12 is a schematic diagram illustrating an example of a data structure of the recorded video list held in wearable camera 10.

If an input operation on attribute information assigning switch SW3 is detected during video recording or after video recording, wearable camera 10 generates attribute information associated with video data of a video recording target and stores meta information including the attribute information in storage 15. In other words, video recording data stored in storage 15 includes the video data and the meta information. In a case where the video data is transmitted to servers SV1 to SV3, wearable camera 10 transmits and accumulates the video recording data including the video data and the meta information to and in servers SV1 to SV3. The video data and the meta information may be transmitted separately from each other.

The meta information associated with the video data is stored in a form of the recorded video list as illustrated in FIG. 12, for example. The meta information of the recorded video list includes video position information (video time information), a car ID, an officer ID, attribute information (incident category), a video recording starting factor, and other information.

The video data and the meta information are linked to each other by using a video data ID. The video data ID is identification information for identifying recorded video data. The video data ID is assigned to the video data, for example, at the time of starting video recording, during the video recording, or at the time of completing the video recording. The video data ID includes, for example, recording start time of the video data, a file name, and other IDs.

The video position information is information regarding time at which the meta information is assigned to the video data, that is, information regarding time (also referred to as attribute information assigning time) at which an input operation on attribute information assigning switch SW3 is detected.

The car ID is identification information for identifying individual patrol car 6. The officer ID is identification information for identifying police officer 7 using wearable camera 10. By setting the car ID and the officer ID, it is possible to discriminate which police officer 7 using which patrol car 6 has recorded the video data by using wearable camera 10.

The incident category is classification information for identifying the type of video data, and is assigned in accordance with attribute selecting switch SW4 on the basis of the set content of the attribute information illustrated in FIG. 10.

The video recording starting factor indicates a factor which causes recording of the video data to be started. The video recording starting factor includes, for example, detection of pressing of video recording switch SW1 or snapshot switch SW2, detection of a video recording starting trigger based on information from the sensor (for example, an acceleration sensor), RTC 17, or GPS 18 provided in wearable camera 10, and in-car system conjunction.

The in-car system conjunction indicates that wearable camera 10 starts video recording in response to a video recording starting instruction from in-car recorder 62 through cooperation between in-car system 60 and wearable camera 10.

The other information includes, for example, GPS information. The GPS information is position information indicating a location where the video data was recorded, and, for example, current position information at the time of assigning the attribute information is acquired from GPS 18 and is assigned as the GPS information.

The meta information assigned by wearable camera 10 is assigned through processing in MCU 19, for example, and is stored in storage 15 in association with the video data captured by wearable camera 10.

One or more meta information pieces may be assigned to a single video data item, that is, a single video data ID. For example, in a case where police officer 7 observes the scene of drug abuse violations during a crackdown on driving under the influence, police officer 7 performs an input operation on attribute information assigning switch SW3 twice while continuing to record video data, and thus wearable camera 10 can assign two meta information pieces to a single video data item.

FIG. 13 is a schematic diagram illustrating an example of a data structure of the recorded video list held in in-car recorder 62.

The recorded video list held in in-car recorder 62 also includes meta information including attribute information associated with video data. The content of the meta information is the same as the content of the meta information illustrated in FIG. 12.

However, in-car recorder 62 can assign more types of attribute information (incident category) than attribute information assigned by wearable camera 10. In in-car recorder 62, the video recording starting factor includes detection of pressing of the attribute information assigning button, detection of a video recording starting trigger based on information from the sensors (for example, a speed sensor, an acceleration sensor, and a door opening/closing sensor) provided in in-car system 60, RTC 17, or GPS 107, and WCAM conjunction.

The WCAM conjunction indicates that in-car camera 61 has started video recording under the instruction of in-car recorder 62 in response to a video recording starting instruction from wearable camera 10 through cooperation between in-car system 60 and wearable camera 10.

The meta information assigned by in-car recorder 62 is assigned through processing in CPU 101, for example, and is stored in SSD 111 in association with the video data captured by in-car camera 61.

Next, an operation example of wearable camera system 100 will be described.

Figure 14:
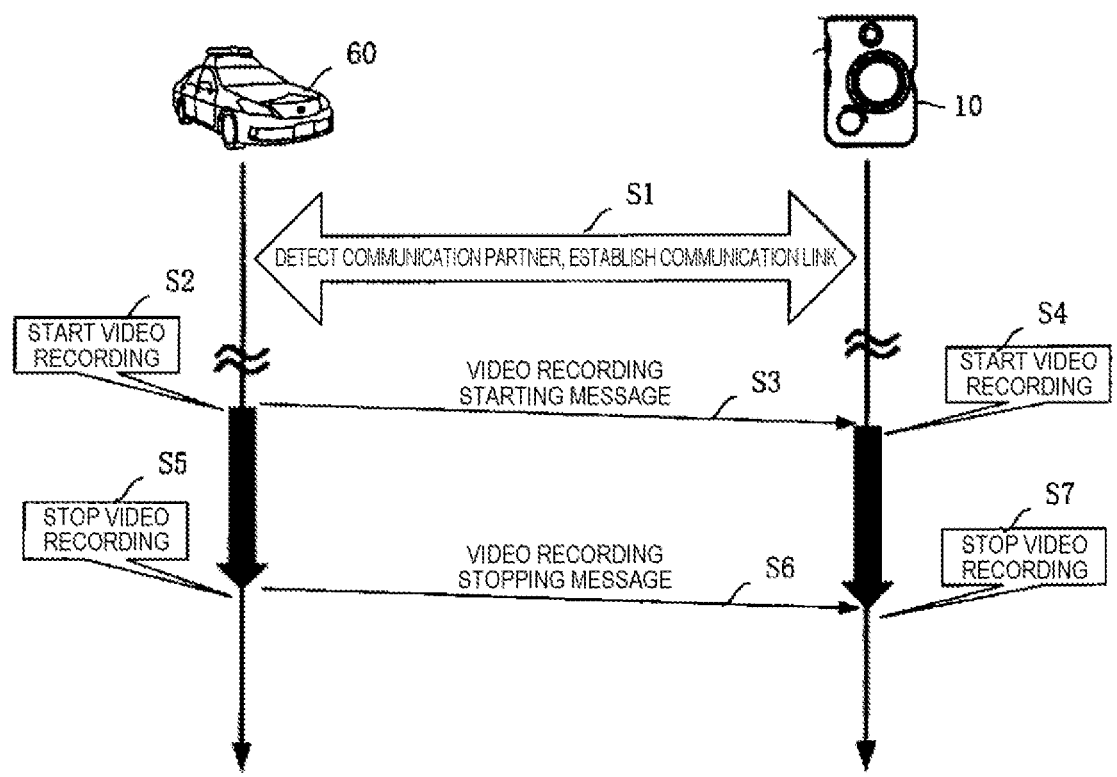
FIG. 14 is a sequence diagram illustrating an operation example of the wearable camera system in a case where the wearable camera starts video recording through in-car system conjunction according to the exemplary embodiment of the present invention.

FIG. 14 is a sequence diagram illustrating an operation example of wearable camera system 100 in a case where wearable camera 10 starts video recording through the in-car system conjunction.

FIG. 14 exemplifies that in-car recorder 62 and wearable camera 10 are connected to each other in a wireless manner via the wireless LAN, but the recorder and the camera may be connected to each other in a wireless manner according to other methods, and may be connected to each other in a wired manner.

First, in-car recorder 62 and wearable camera 10 detect mutual communication partners so that a communication link between in-car recorder 62 and wearable camera 10 is established (step S1). Specifically, CPU 101 of in-car recorder 62 and MCU 19 of wearable camera 10 detect communication partners by performing a pairing process by using, for example, SSIDs and passwords for the wireless LAN.

Wireless communicator 102 of in-car recorder 62 and communicator 21 of wearable camera 10 exchange, for example, car IDs and officer IDs which are respectively held therein, and the communication link is established in a case where the car IDs and the officer IDs held in a host device and a communication partner device respectively match each other.

Wireless communicator 102 of in-car recorder 62 and communicator 21 of wearable camera 10 may establish the communication link when detecting communication partners without checking matching of the camera IDs and the officer IDs. For example, in a case where police officer 7 is not logging in to in-car PC 63, the camera ID and the officer ID are not input to in-car recorder 62, and thus the camera ID and the officer ID are not held in in-car recorder 62.

Even in this case, the communication link can be established between in-car system 60 and wearable camera 10. For example, even in a case where combinations of police officer 7 and a patrol car at the time of dispatch differ every time and thus are not fixed, in-car recorder 62 and wearable camera 10 can be easily connected to each other by using the wireless LAN or the like.

In in-car recorder 62, if a video recording starting trigger is detected, CPU 101 starts recording of video data which is captured by in-car camera 61 and starts storing of the video data in SSD 111 (step S2).

The video recording starting trigger in in-car recorder 62 includes, for example, detection of pressing of buttons 109, detection of starting of lighting and ringing of patrol lamps of patrol car 6 in CPU 101, detection of a traveling speed of patrol car 6 being equal to or higher than a predetermined speed (for example, 100 km/h) in the speed sensor, detection of an impact in the acceleration sensor (that is, detection of a change in acceleration of a predetermined threshold value or greater), and detection of being out of a communication range in which communication between wireless communicator 102 and wearable camera 10 cannot be performed.

Wireless communicator 102 notifies wearable camera 10 as a communication partner of a video recording starting message (for example, a message "REC START") including information indicating that video recording has started when CPU 101 starts recording of video data (step S3).

In wearable camera 10, if communicator 21 receives the video recording starting message from in-car recorder 62, MCU 19 starts recording of video data which is captured by capture 11 and starts storing of the video data in storage 15 (step S4).

As mentioned above, since video recording is started in wearable camera 10 in conjunction with video recording starting in in-car recorder 62, for example, even in a case where police officer 7 forgets a video recording starting operation on video recording switch SW1 or snapshot switch SW2 of wearable camera 10 due to emergency response, video data of scene 8 can be recorded and be checked in the future.

For example, in a case where in-car recorder 62 and wearable camera 10 have a long distance therebetween and are thus out of a communication range using the wireless LAN when a video recording starting trigger is detected, in-car recorder 62 may transmit a video recording starting message after the wireless connection is recovered.

Wearable camera 10 may not start video recording immediately after receiving the video recording starting message. For example, wearable camera 10 may not start video recording when the video recording starting message is received during traveling of patrol car 6, and may start video recording when detecting that the wireless connection with in-car recorder 62 is canceled due to becoming distant from patrol car 6. Consequently, it is possible to use a resource of storage 15 which accumulates recorded video data, with high efficiency.

After in-car recorder 62 and wearable camera 10 start video recording, if CPU 101 of in-car recorder 62 detects a video recording stopping trigger, CPU 101 stops recording of the video data captured by in-car camera 61 and stops storing of the video data in SSD 111 (step S5).

The video recording stopping trigger in in-car recorder 62 includes, for example, detection of pressing of buttons 109 in CPU 101 during video recording, and detection of a predetermined time period elapsing from the video recording starting in in-car recorder 62.

Wireless communicator 102 of in-car recorder 62 notifies wearable camera 10 as a communication partner of a video recording stopping message (for example, a message "REC STOP") including information indicating that the video recording has stopped when CPU 101 stops recording of video data (step S6).

In wearable camera 10, if communicator 21 receives the video recording stopping message from in-car recorder 62, MCU 19 stops recording of the video data captured by capture 11 and stops storing of the video data in storage 15 (step S7).

As mentioned above, since video recording is stopped in wearable camera 10 in conjunction with video recording stoppage in in-car recorder 62, for example, even in a case where police officer 7 forgets a video recording stopping operation on video recording switch SW1 of wearable camera 10 due to emergency response, video data of scene 8 can be stopped from being recorded. Therefore, it is possible to reduce unnecessary power consumption or unnecessary use of the memory due to forgetfulness of stopping of video data recording.

FIG. 14 exemplifies that in-car recorder 62 stops video recording and transmits the recording stopping message in steps S5 and S6, and wearable camera 10 receives the video recording stopping message and stops video recording in step S7. Alternatively, wearable camera 10 may stop video recording and may transmit the video recording stopping message in steps S5 and S6, and in-car recorder 62 may receive the video recording stopping message and may stop video recording in step S7.

The processes in steps S5 to S7 may be omitted. In other words, cooperation for stopping video recording between in-car recorder 62 and wearable camera 10 may not be performed.

For example, in a case where in-car recorder 62 and wearable camera 10 have a long distance therebetween and are thus out of a communication range using the wireless LAN when a video recording stopping trigger is detected, in-car recorder 62 may transmit a video recording stopping message after the wireless connection is recovered.

There may be a plurality of wearable cameras 10 which receive a video recording starting message and start video recording. Similarly, there may be a plurality of wearable cameras 10 which receive a video recording stopping message and stop video recording. For example, it is assumed that a plurality of police officers 7 ride in patrol car 6.

Figure 15:
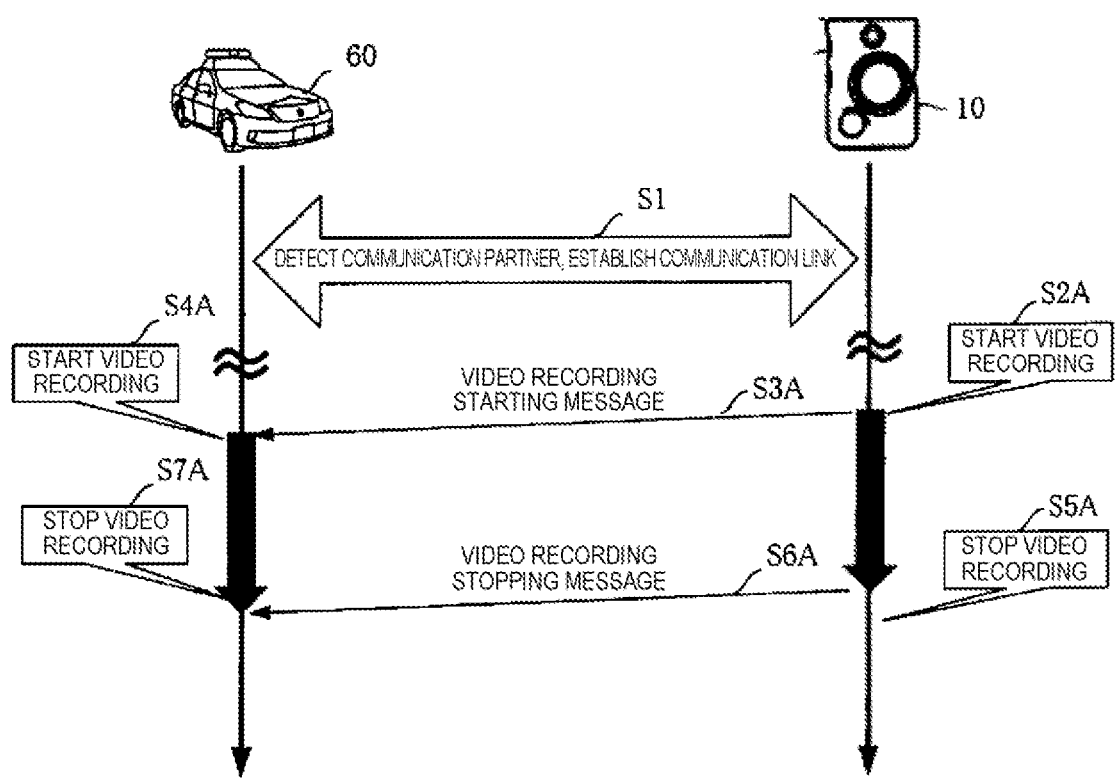
FIG. 15 is a sequence diagram illustrating an operation example of the wearable camera system in a case where the in-car system starts video recording through wearable camera (WCAM) conjunction according to the exemplary embodiment of the present invention.

FIG. 15 is a sequence diagram illustrating an operation example of wearable camera system 100 in a case where in-car recorder 62 starts video recording through wearable camera (WCAM) conjunction. In the operation example illustrated in FIG. 15, the same processes as in the operation example illustrated in FIG. 14 are given the same step numbers, and description thereof will be omitted or will be made briefly.

In wearable camera 10, if a video recording starting trigger is detected, MCU 19 starts recording of video data which is captured by capture 11 and starts storing of the video data in storage 15 (step S2A).

The video recording starting trigger in wearable camera 10 includes, for example, detection of pressing of video recording switch SW1 or snapshot switch SW2 in MCU 19, detection of cancelation of wireless connection between in-car recorder 62 and wearable camera 10 in MCU 19, detection of an impact in the acceleration sensor (that is, detection of a change in acceleration of a predetermined threshold value or greater), detection of police officer 7 being present in a predetermined area in GPS 18, and detection of police officer 7 starting to run in GPS 18. The detection of an impact in the acceleration sensor includes detection of police officer 7 starting to run and falling.

Communicator 21 notifies in-car recorder 62 as a communication partner of a video recording starting message (for example, a message "REC START") including information indicating that video recording has been started when MCU 19 starts recording of video data (step S3A).

In in-car recorder 62, if wireless communicator 102 receives the video recording starting message from wearable camera 10, CPU 101 starts recording of video data which is captured by in-car camera 61 and starts storing of the video data in SSD 111 (step S4A).

As mentioned above, since video recording is started in in-car recorder 62 in conjunction with video recording starting in wearable camera 10, for example, even in a case where police officer 7 arrives at scene 8, then an incident occurs, and video recording is not started by in-car camera 61 in patrol car 6, video data of scene 8 can be recorded by in-car camera 61 and be checked in the future.

After wearable camera 10 and in-car recorder 62 start video recording, if MCU 19 of wearable camera 10 detects a video recording stopping trigger, MCU 19 stops recording of the video data captured by capture 11 and stops storing of the video data in storage 15 (step S5A).

The video recording stopping trigger in wearable camera 10 includes, for example, detection of pressing of video recording switch SW1 in MCU 19 during video recording, and detection of a predetermined time period elapsing from the video recording starting in wearable camera 10.

Communicator 21 notifies in-car recorder 62 as a communication partner of a video recording stopping message (for example, a message "REC STOP") including information indicating that the video recording has stopped when MCU 19 stops recording of video data (step S6A).

In in-car recorder 62, if wireless communicator 102 receives the video recording stopping message from wearable camera 10, CPU 101 stops recording of the video data captured by in-car camera 61 and stops storing of the video data in SSD 111 (step S7A).

As mentioned above, since video recording is stopped in in-car recorder 62 in conjunction with video recording stoppage in wearable camera 10, for example, even in a case where police officer 7 forgets a pressing operation of buttons 109 for stopping video recording, video data captured by in-car camera 61 can be stopped from being recorded. Therefore, it is possible to reduce unnecessary power consumption or unnecessary use of the memory due to forgetfulness of stopping of video data recording.

FIG. 15 exemplifies that wearable camera 10 stops video recording and transmits the video recording stopping message in steps S5A and S6A, and in-car recorder 62 receives the video recording stopping message and stops video recording in step S7A. Alternatively, in-car recorder 62 may stop video recording and may transmit the video recording stopping message in steps S5A and S6A, and wearable camera 10 may receive the video recording stopping message and may stop video recording in step S7A.

The processes in steps S5A to S7A may be omitted. In other words, cooperation for stopping video recording between wearable camera 10 and in-car recorder 62 may not be performed.

Figure 16:
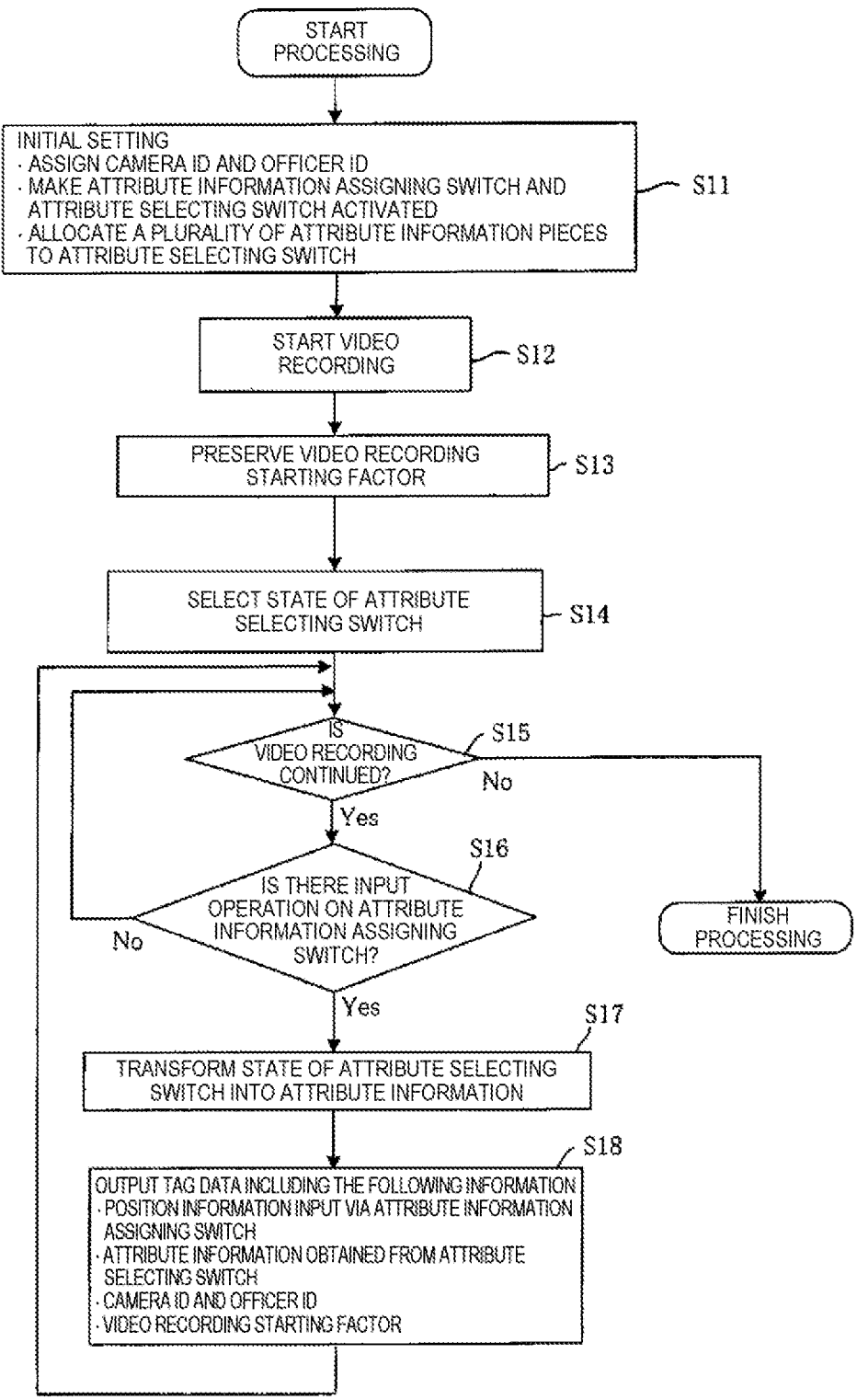
FIG. 16 is a flowchart illustrating an example of a procedure regarding an attribute information assigning operation in the wearable camera according to the exemplary embodiment of the present invention.

FIG. 16 is a flowchart illustrating an example of a procedure regarding an attribute information assigning operation performed by wearable camera 10 of the present exemplary embodiment.

MCU 19 of wearable camera 10 performs initial setting prior to assigning of attribute information (step S11). The initial setting of wearable camera 10 is performed by police officer 7 accessing in-station PC 71 in police station 5 and transmitting setting information through an operation of in-station PC 71 when being dispatched.

The initial setting includes, for example, assigning of a camera ID and an officer ID, making attribute information assigning switch SW3 and attribute selecting switch SW4 activated, and allocating a plurality of attribute information pieces to attribute selecting switch SW4 (refer to FIG. 10, for example).

If a video recording starting message is received from in-car recorder 62, MCU 19 starts a video recording operation and stores video data captured by capture 11 in storage 15 (step S12). The video data herein may be a moving image and a still image.

If a video recording operation is started according to the video recording starting message from in-car recorder 62, MCU 19 preserves information regarding the in-car system conjunction in RAM 13 as information regarding the video recording starting factor included in the meta information (step S13).

After the video data starts being recorded, MCU 19 inputs a selection state of attribute selecting switch SW4 (step S14).

MCU 19 determines whether or not video recording is continuously performed (step S15). For example, in a case where a video recording stopping message is not acquired by communicator 21, the video recording is continuously performed. In a case where the video recording is not continuously performed, MCU 19 finishes the attribute information assigning operation.

If the video recording is continuously performed, MCU 19 determines whether or not an input operation on attribute information assigning switch SW3 is performed (step S16). In other words, attribute information is assigned through an operation performed by police officer 7 during or after recording of video data. A selection state of attribute selecting switch SW4 may be changed during recording of a single video data item. In other words, a plurality of attribute information pieces may be assigned to a single video data item.

If there is an input operation on attribute information assigning switch SW3, MCU 19 reads attribute information corresponding to the state of attribute selecting switch SW4 from EEPROM 16, and assigns the attribute information to the video data (step S17). If there is no input operation on attribute information assigning switch SW3, the flow proceeds to step S13.

MCU 19 stores meta information including the assigned attribute information in storage 15 in association with video data recorded during recording or immediately before (step S18). The meta information here includes, for example, video position information, a camera ID, an officer ID, attribute information (incident category), and a video recording starting factor as shown in the recorded video list of FIG. 12.

The video position information is acquired as current time from RTC 17 during an input operation on attribute information assigning switch SW3, for example. The camera ID and the officer ID are acquired from EEPROM 16, for example. The video recording starting factor is acquired from RAM 13 in which the video recording starting factor is preserved in step S13, for example. After the process in step S18 is performed, the flow proceeds to step S15.

In wearable camera 10, MCU 19 may light at least some of LEDs 26a to 26c according to the preserved video recording starting factor. For example, according to the video recording starting factor, lighting time may be changed, a blinking method may be changed, or a lighting color may be changed.

Consequently, police officer 7 carrying wearable camera 10 can easily recognize starting of video recording and the video recording starting factor without performing a voluntary operation by checking LEDs 26a to 26c.

As mentioned above, according to the attribute information assigning operation in wearable camera 10, attribute information can be easily assigned immediately after recording or during recording, and thus meta information can be preserved with respect to recorded video data. Therefore, for example, it is not necessary for police officer 7 to leave scene 8 imaged by wearable camera 10 and then to assign meta information with in-station PC 71 or the like in police station 5 so as to edit the meta information. In other words, it is not necessary for police officer 7 to determine the type of video data while reproducing the video data and to perform an input operation of attribute information or meta information, and it is possible to reduce time and effort to input the attribute information or the meta information. Since video data in which attribute information or meta information is not input can be prevented from being collected, it is possible to minimize time and effort to check individual video data, and thus to reduce efforts to determine the type of video data and to input the attribute information or the meta information.

Since wearable camera 10 holds the information regarding the video recording starting factor included in the meta information, it can be understood after recording that wearable camera 10 has started video recording in conjunction with in-car system 60 by using, for example, in-station PC 71, in-car PC 63, or a portable terminal.

As mentioned above, in the present exemplary embodiment, since wearable camera 10 and in-car recorder 62 start video recording through cooperation therebetween, the video recording can be started in response to a video recording starting message from one of wearable camera 10 and in-car recorder 62 even in a case where the other of wearable camera 10 and in-car recorder 62 does not start the video recording.

Therefore, for example, even in a case where police officer 7 hurries for an emergency response and thus forgets an input operation on video recording switch SW1 of wearable camera 10 or cannot perform the input operation, wearable camera 10 can also start video recording if a video recording starting trigger occurs in in-car recorder 62.

As mentioned above, according to wearable camera system 100, it is possible to improve convenience of handling video data captured by wearable camera 10. It is possible to prevent video data from being omitted for a specific period of time and thus to improve performance of monitoring scene 8 or evidence performance of the video data.

As mentioned above, wearable camera system 100 of the present exemplary embodiment includes wearable camera 10 which can be mounted on a user, in-car recorder 62 which is equipped in a vehicle in which the user rides, and in-car camera 61 which is equipped in the vehicle. In-car camera 61 includes a first capture which captures videos. In-car recorder 62 includes a first communicator which performs communication with wearable camera 10 as a communication partner, and a first recorder which records first video data captured by in-car camera 61. Wearable camera 10 includes a second capture which captures videos; a second communicator which performs communication with in-car recorder 62 as a communication partner; and a second recorder which records second video data captured by the second capture. One of in-car recorder 62 and wearable camera 10 transmits video recording starting information including information indicating that video recording has been started to the other of in-car recorder 62 and wearable camera 10 when one of in-car recorder 62 and wearable camera 10 starts the video recording. The other of in-car recorder 62 and wearable camera 10 starts video recording after the video recording starting information is received.

The first communicator is, for example, wireless communicator 102 or wired communicator 103. The first recorder is, for example, CPU 101. The second capture is, for example, capture 11. The second recorder is, for example, MCU 19. The user is, for example, police officer 7. The vehicle is, for example, patrol car 6. The video recording starting information is, for example, the video recording starting message.

Consequently, since wearable camera 10 and in-car recorder 62 start video recording through cooperation therebetween, one of wearable camera 10 and in-car recorder 62 can assist the other thereof in the video recording operation, and thus video data can be reliably recorded in both of the devices. Therefore, wearable camera system 100 can improve convenience of handling video data captured by wearable camera 10 and can thus reduce recording omission of the video data. Thus, for example, it is possible to improve monitoring performance of wearable camera system 100 or evidence performance of video data.

In wearable camera system 100, one of in-car recorder 62 and wearable camera 10 may transmit video recording stopping information including information indicating that video recording has been stopped to the other of in-car recorder 62 and wearable camera 10 when one of in-car recorder 62 and wearable camera 10 stops the video recording. The other of in-car recorder 62 and wearable camera 10 may stop the video recording after the video recording stopping information is received. The video recording stopping information is, for example, the video recording stopping message.

Consequently, since wearable camera 10 and in-car recorder 62 stop video recording through cooperation therebetween, one of wearable camera 10 and in-car recorder 62 can assist the other thereof in the operation of stopping the video recording, and thus recording of video data can be reliably stopped in both of the devices. Thus, wearable camera system 100 can reduce recording omission of the video data and can reduce recording capacity required to record the video data.

In wearable camera system 100, wearable camera 10 may include an operator, storage 15, and a controller. The operator receives an assigning operation of information associated with the second video data. In a case where the assigning operation is received, storage 15 stores factor information indicating a factor of starting of recording of the second video data in correlation with the second video data. In a case where recording of the second video data is started on the basis of the video recording starting information, the controller stores conjunction information indicating that the video recording has been started in conjunction with in-car recorder 62 in the factor information.

The operator is, for example, attribute information assigning switch SW3. The controller is, for example, MCU 19. The factor information is, for example, the information regarding the video recording starting factor. The conjunction information is, for example, the information regarding the in-car system conjunction.

Consequently, a user such as police officer 7 can identify information (meta information or the like) associated with video data, and can easily recognize a factor which causes the video data to be recorded after the video data is recorded by referring to the conjunction information. Therefore, it is possible to facilitate management of video data and thus to easily identify content of the video data after being recorded.

The video recording control method of the present exemplary embodiment is a video recording control method for wearable camera system 100 including wearable camera 10 which can be mounted on a user, in-car recorder 62 which is equipped in a vehicle in which the user rides, and in-car camera 61 which is equipped in the vehicle. The video recording control method includes an image capturing step of causing in-car camera 61 to capture videos and causing wearable camera 10 to capture videos; a video recording step of causing in-car recorder 62 to record first video data captured by in-car camera 61 and causing wearable camera 10 to record second video data captured by wearable camera 10; and a communication step of performing communication between in-car recorder 62 and wearable camera 10. In the video recording step, video recording is started by one of in-car recorder 62 and wearable camera 10. In the communication step, video recording starting information including information indicating that video recording has been started is transmitted to the other of in-car recorder 62 and wearable camera 10 when one of in-car recorder 62 and wearable camera 10 starts the video recording. In the video recording step, video recording is started after the other of in-car recorder 62 and wearable camera 10 receives the video recording starting information.

Consequently, since wearable camera 10 and in-car recorder 62 start video recording through cooperation therebetween, one of wearable camera 10 and in-car recorder 62 can assist the other thereof in the video recording operation, and thus video data can be reliably recorded in both of the devices. Thus, wearable camera system 100 can improve convenience of handling video data captured by wearable camera 10 and can thus reduce recording omission of the video data. Therefore, for example, it is possible to improve monitoring performance of wearable camera system 100 or evidence performance of video data.

Next, a second exemplary embodiment of the present invention will be described. A configuration related to the second exemplary embodiment is the same as the configuration described with reference to FIGS. 1 to 13. An operation mode of wearable camera system 100 of the second exemplary embodiment will be described.

Operation modes are defined according to the operation policy of each police station 5, and are set by in-station PC 71 executing management software 70. The operation modes include an officer mode and a car mode.

Setting information of the operation modes is transmitted from in-station PC 71 to in-car recorder 62 so as to be held in flash ROM 104 or the like of in-car recorder 62, and is transmitted from in-station PC 71 to wearable camera 10 so as to be held in EEPROM 16 or the like of wearable camera 10.

The officer mode is employed in an operation in which combinations of police officer 7 and patrol car 6 in which police officer 7 rides differ for every dispatch, and is set by in-station PC 71. The car mode is employed in an operation in which combinations of police officer 7 and patrol car 6 in which police officer 7 rides are the same as each other for every dispatch, and is set by in-station PC 71. The operation modes are defined according to the operation policy of police station 5, and thus a frequency thereof to be changed is low.

In the officer mode, combinations of police officer 7 and patrol car 6 are changed every time, and thus police officer 7 cannot be identified even using the car ID. For this reason, in the officer mode, at least the officer ID is set in EEPROM 16 or the like of wearable camera 10 and flash ROM 104 or the like of in-car recorder 62 through setting and registration using in-station PC 71 or login to in-car PC 63 when police officer 7 is dispatched from police station 5.

Consequently, since the officer ID held in in-car recorder 62 is collated with the officer ID held in wearable camera 10, both of police officer 7 and patrol car 6 used by police officer 7 can be identified.

In a case where the same police officer 7 uses the same wearable camera 10 for every dispatch, in-station PC 71 may set and register identification information (officer ID) of a user of wearable camera 10 once for the first time.

In the car mode, since combinations of police officer 7 and patrol car 6 are not changed, the car ID corresponds to the officer ID, and police officer 7 can be identified by using the car ID. For this reason, in the car mode, at least car ID is set in EEPROM 16 or the like of wearable camera 10 and flash ROM 104 or the like of in-car recorder 62 through setting and registration using in-station PC 71 or login to in-car PC 63 when police officer 7 is dispatched from police station 5.

Consequently, since the car ID held in in-car recorder 62 is collated with the car ID held in wearable camera 10, both of police officer 7 and patrol car 6 used by police officer 7 can be identified.

In a case where the same police officer 7 uses the same patrol car 6 for every dispatch, in-station PC 71 may set and register identification information (car ID) of patrol car 6 used by police officer 7 once for the first time.

Next, a description will be made of an operation example of wearable camera system 100. Also in the second exemplary embodiment, the same configuration as described above will be given the same reference numeral and will be described.

Figure 17:
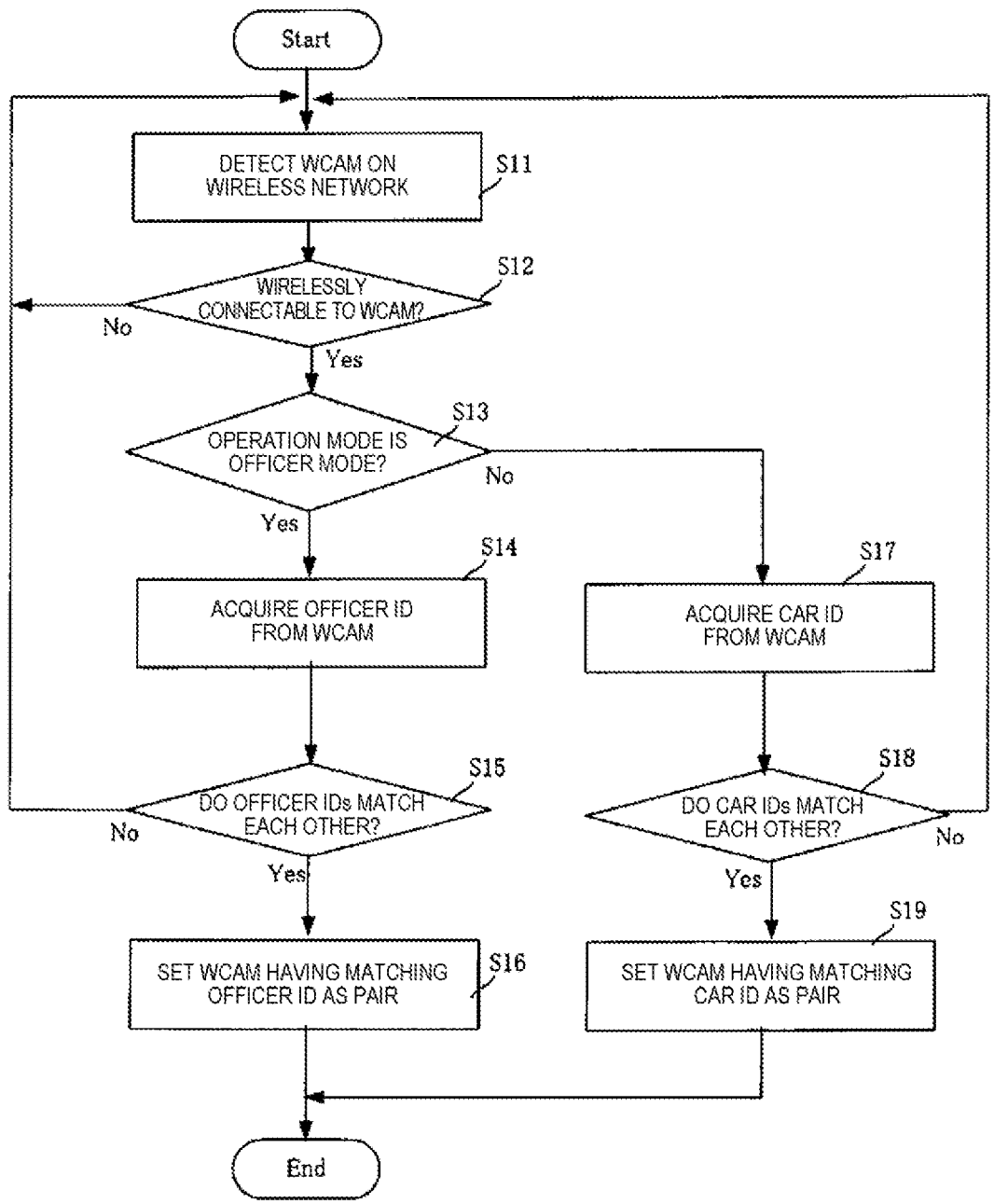
FIG. 17 is a flowchart illustrating an operation example in a case where a specific wearable camera is searched for as a communication partner by an in-car recorder according to a second exemplary embodiment of the present invention.

FIG. 17 is a flowchart illustrating an operation example in a case where in-car recorder 62 searches for specific wearable camera 10 as a communication partner. Here, a communication partner is detected by using, for example, wireless LAN communication, but a communication partner may be detected by using other methods.

When police officer 7 is dispatched, it is expected that a plurality of police officers 7 ride in patrol car 6, and each police officer 7 carries wearable camera 10. Also in this case, in-car recorder 62 can specify wearable camera 10 which is a wireless connection target among a plurality of wearable cameras 10 through the process illustrated in FIG. 14. In-car recorder 62 may be specified as in-car recorder 62 which is a wireless connection target by authenticating whether or not detected single wearable camera 10 is a wearable camera to be wirelessly connected.

First, wireless communicator 102 detects at least one wearable camera 10 on the wireless network (step S11). Wearable camera 10 is also referred to as a "WCAM".

CPU 101 collates detected wearable cameras 10 by using, for example, an SSID and a password (encryption key) so as to determine whether or not each camera is wearable camera 10 which can be wirelessly connected (step S12). If the camera is wearable camera 10 which cannot be wirelessly connected, the flow proceeds to step S11.

If the camera is wearable camera 10 which can be wirelessly connected, CPU 101 refers to the operation mode of wearable camera system 100 which are held and set in, for example, flash ROM 104 in advance, and determines whether the operation mode is the officer mode or the car mode (step S13).

In step S13, if the operation mode of wearable camera system 100 is the officer mode, wireless communicator 102 acquires an officer ID from wearable camera 10 (step S14).

CPU 101 determines whether or not the officer ID held in flash ROM 104 or the like matches the officer ID acquired from wearable camera 10 (step S15). If both of the two IDs do not match each other, the flow proceeds to step S11.

If the officer IDs match each other, CPU 101 specifies detected wearable camera 10 as wearable camera 10 which is a communication partner (step S16). Wireless communicator 102 establishes a communication link between in-car recorder 62 and specified wearable camera 10.

If the operation mode of wearable camera system 100 is the car mode in step S13, wireless communicator 102 acquires a car ID from wearable camera 10 (step S17).

CPU 101 determines whether or not the car ID held in flash ROM 104 or the like matches the car ID acquired from wearable camera 10 (step S18). If both of the two IDs do not match each other, the flow proceeds to step S11.

If the car IDs match each other, CPU 101 specifies detected wearable camera 10 as wearable camera 10 which is a communication partner (step S19). Wireless communicator 102 establishes a communication link between in-car recorder 62 and specified wearable camera 10.

If a communication partner is derived in step S16 or S19, CPU 101 generates management table T1 illustrated in FIG. 18.

FIG. 18 is a schematic diagram illustrating an example of management table T1 which holds information regarding wearable camera 10 derived as a communication partner (pair). Management table T1 holds identification information or a name of wearable camera 10 (WCAM), an IP address for accessing wearable camera 10, and information (Yes/No) indicating whether or not wearable camera 10 is selected as a communication partner. In a case where wearable camera 10 is selected as a communication partner, "Yes" is set, and in a case where wearable camera 10 is not selected as a communication partner, "No" is set. The information regarding wearable camera 10 detected in step S11 is held in management table T1.

Figure 20:
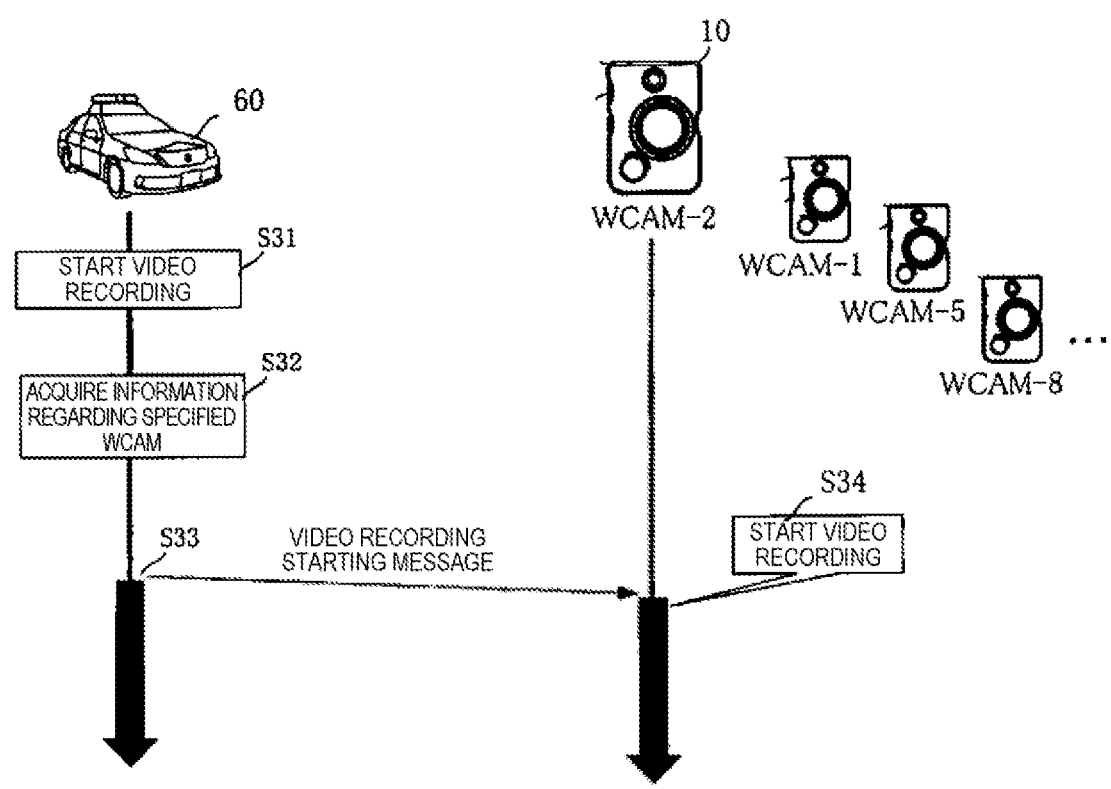
FIG. 20 is a sequence diagram illustrating an operation example of the wearable camera system in a case where the wearable camera starts video recording through in-car system conjunction according to the second exemplary embodiment of the present invention.

Management table T1 exemplifies that WCAM-2 is specified as wearable camera 10 which is a communication partner among a plurality of wearable cameras 10 (WCAM-1, WCAM-2, WCAM-5, WCAM-8, and WCAM-12) (refer to FIGS. 18 and 20).

According to the process illustrated in FIG. 17, it is possible to search for in-car recorder 62 and specific wearable camera 10 between which a communication link should be established, by using identification information which is appropriate for an operation of police station 5. Also in this case, police officer 7, patrol car 6 used by police officer 7, and wearable camera 10 can be linked to each other.

CPU 101 may specify detected wearable camera 10 as a communication partner through collation using an SSID and a password when single wearable camera 10 is detected. In other words, the processes in step S13 and the subsequent steps may be omitted.

Figure 19:
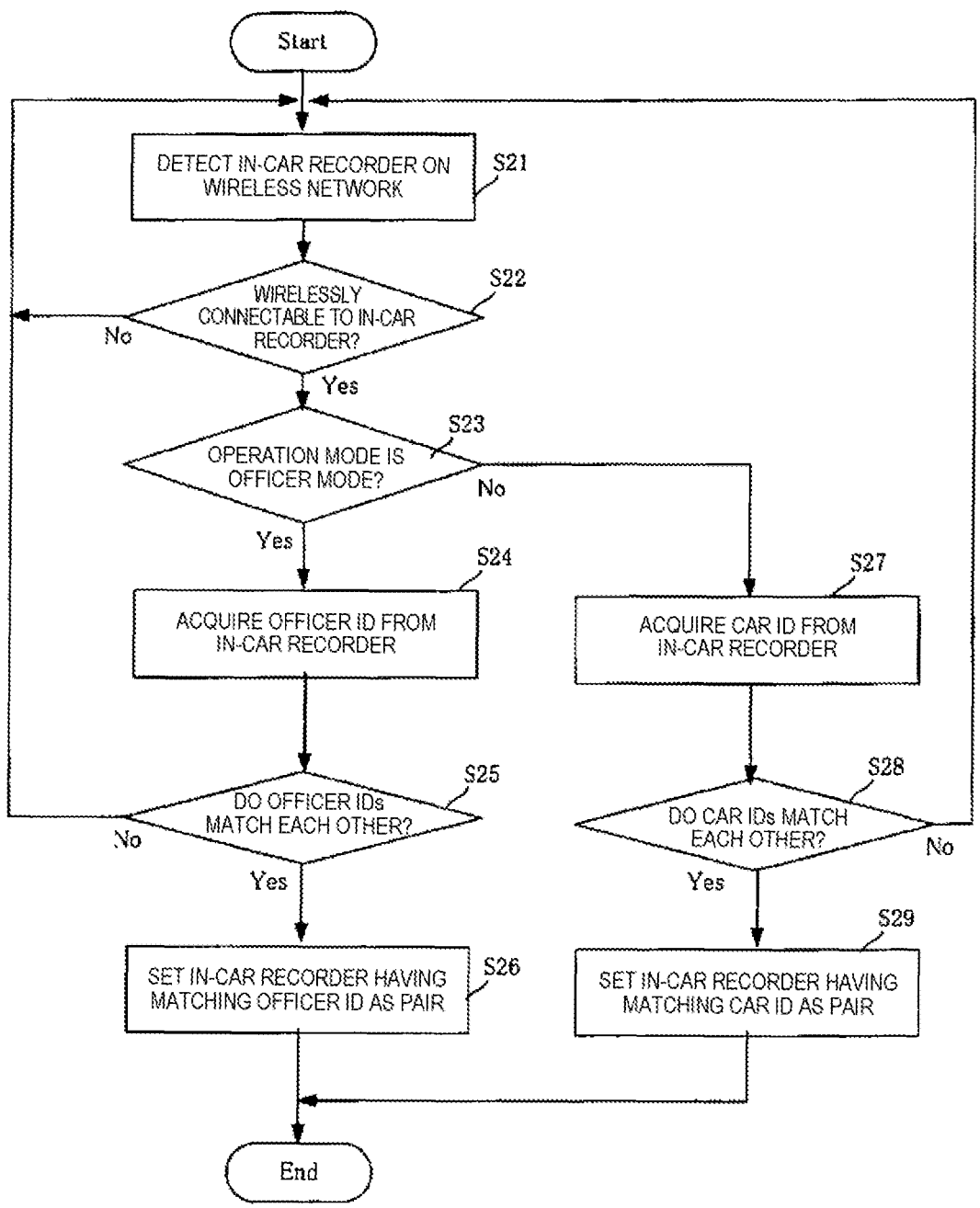
FIG. 19 is a flowchart illustrating an operation example in a case where a specific in-car recorder is searched for as a communication partner by a wearable camera according to the second exemplary embodiment of the present invention.

FIG. 19 is a flowchart illustrating an operation example in a case where wearable camera 10 searches for in-car recorder 62 as a communication partner. Here, a communication partner is detected by using, for example, wireless LAN communication, but a communication partner may be detected by using other methods.

When police officer 7 is dispatched, since single in-car recorder 62 is provided in patrol car 6 in most cases, wearable camera 10 can specify in-car recorder 62 which is a wireless connection target by authenticating whether or not detected single in-car recorder 62 is in-car recorder 62 which is to be wirelessly connected. It is also expected that a plurality of in-car recorders 62 may be provided in patrol car 6 or a plurality of patrol cars 6 are collected at scene 8. In this case, wearable camera 10 may specify in-car recorder 62 which is a wireless connection target among a plurality of in-car recorders 62.

First, communicator 21 detects in-car recorder 62 on the wireless network (step S21).

MCU 19 collates detected in-car recorder 62 by using, for example, an SSID and a password (encryption key) so as to determine whether or not in-car recorder 62 is in-car recorder 62 which can be wirelessly connected (step S22). If the detected in-car recorder 62 is in-car recorder 62 which cannot be wirelessly connected, the flow proceeds to step S21.

If the detected in-car recorder 62 is in-car recorder 62 which can be wirelessly connected, MCU 19 refers to the operation mode of wearable camera system 100 which are held and set in, for example, EEPROM 16 in advance, and determines whether the operation mode is the officer mode or the car mode (step S23).

In step S23, if the operation mode of wearable camera system 100 is the officer mode, communicator 21 acquires an officer ID from in-car recorder 62 (step S24).

MCU 19 determines whether or not the officer ID held in EEPROM 16 or the like matches the officer ID acquired from in-car recorder 62 (step S25). If both of the two IDs do not match each other, the flow proceeds to step S21.

If the officer IDs match each other, MCU 19 specifies detected in-car recorder 62 as in-car recorder 62 which is a communication partner (step S26). Communicator 21 establishes a communication link between specified in-car recorder 62 and wearable camera 10.

If the operation mode of wearable camera system 100 is the car mode in step S23, communicator 21 acquires a car ID from in-car recorder 62 (step S27).

MCU 19 determines whether or not the car ID held in EEPROM 16 or the like matches the car ID acquired from in-car recorder 62 (step S28). If both of the two IDs do not match each other, the flow proceeds to step S21.

If the car ID held in EEPROM 16 or the like matches the car ID acquired from in-car recorder 62, MCU 19 specifies detected in-car recorder 62 as in-car recorder 62 which is a communication partner (step S29). Communicator 21 establishes a communication link between specified in-car recorder 62 and wearable camera 10.

If a communication partner is derived in step S26 or S29, MCU 19 generates a management table such as management table T1 illustrated in FIG. 18. The management table holds identification information or a name of in-car recorder 62, an IP address for accessing in-car recorder 62, and information (Yes/No) indicating whether or not in-car recorder 62 is selected as a communication partner. The information regarding in-car recorder 62 detected in step S21 is held in the management table.

According to the process illustrated in FIG. 19, it is possible to search for specific in-car recorder 62 and wearable camera 10 between which a communication link should be established, by using identification information which is appropriate for an operation of police station 5. Also in this case, police officer 7, patrol car 6 used by police officer 7, and wearable camera 10 can be linked to each other.

MCU 19 may specify detected in-car recorder 62 as a communication partner through collation using an SSID and a password when single in-car recorder 62 is detected. In other words, the processes in step S23 and the subsequent steps may be omitted.

FIG. 20 is a sequence diagram illustrating an operation example of wearable camera system 100 in a case where wearable camera 10 starts video recording through in-car system conjunction.

FIG. 20 exemplifies that in-car recorder 62 and wearable camera 10 are connected to each other in a wireless manner via the wireless LAN, but the recorder and the camera may be connected to each other in a wireless manner according to other methods, and may be connected to each other in a wired manner.

In in-car recorder 62, if a video recording starting trigger is detected, CPU 101 starts recording of video data which is captured by in-car camera 61 and starts storing of the video data in SSD 111 (step S31).

The video recording starting trigger in in-car recorder 62 includes, for example, detection of pressing of buttons 109, detection of starting of lighting and ringing of patrol lamps of patrol car 6 in CPU 101, detection of a traveling speed of patrol car 6 being equal to or higher than a predetermined speed (for example, 100 km/h) in the speed sensor, detection of an impact in the acceleration sensor (that is, detection of a change in acceleration of a predetermined threshold value or greater), and detection of being out of a communication range in which communication between wireless communicator 102 and wearable camera 10 cannot be performed.

CPU 101 refers to management table T1 indicating the results of the above-described searching process of a communication partner when recording of the video data is started, and acquires information regarding wearable camera 10 as a communication partner (step S32). The acquired information regarding wearable camera 10 includes at least some of the information regarding wearable camera 10 held in management table T1.

Wireless communicator 102 notifies wearable camera 10 regarding which the information is acquired, that is, specific wearable camera 10 (for example, WCAM-2) of a video recording starting message (for example, a message "REC START") including information indicating that the video recording has been started (step S33).

In specific wearable camera 10 (for example, WCAM-2), if communicator 21 receives the video recording starting message from in-car recorder 62, MCU 19 starts recording of video data which is captured by capture 11 and starts storing of the video data in storage 15 (step S34).

As mentioned above, video recording is started in specific wearable camera 10 in conjunction with video recording starting in in-car recorder 62. Thus, for example, even in a case where police officer 7 forgets a video recording starting operation on video recording switch SW1 or snapshot switch SW2 of specific wearable camera 10 due to emergency response, video data of scene 8 can be recorded and be checked in the future.

For example, in a case where in-car recorder 62 and wearable camera 10 have a long distance therebetween and are thus out of a communication range using the wireless LAN when specific wearable camera 10 as a communication partner is derived, in-car recorder 62 may transmit a video recording starting message after the wireless connection is recovered.

Specific wearable camera 10 may not start video recording immediately after receiving the video recording starting message. For example, specific wearable camera 10 may not start video recording when the video recording starting message is received during traveling of patrol car 6, and may start video recording when detecting that the wireless connection with in-car recorder 62 is canceled due to becoming distant from patrol car 6. Consequently, it is possible to use a resource of storage 15 which accumulates recorded video data, with high efficiency.

FIG. 21 is a sequence diagram illustrating an operation example of wearable camera system 100 in a case where in-car recorder 62 starts video recording through WCAM conjunction.

FIG. 21 exemplifies that in-car recorder 62 and wearable camera 10 are connected to each other in a wireless manner via the wireless LAN, but the recorder and the camera may be connected to each other in a wireless manner according to other methods, and may be connected to each other in a wired manner.

In wearable camera 10, if a video recording starting trigger is detected, MCU 19 starts recording of video data which is captured by capture 11 and starts storing of the video data in storage 15 (step S41).

The video recording starting trigger in wearable camera 10 includes, for example, detection of pressing of video recording switch SW1 or snapshot switch SW2 in MCU 19, detection of cancelation of wireless connection between in-car recorder 62 and wearable camera 10 in communicator 21, detection of an impact in the acceleration sensor (that is, detection of a change in acceleration of a predetermined threshold value or greater), detection of police officer 7 being present in a predetermined area in GPS 18, and detection of police officer 7 starting to run in GPS 18. The detection of an impact in the acceleration sensor includes detection of police officer 7 starting to run and falling.

MCU 19 refers to the management table indicating the results of the above-described searching process of a communication partner when recording of the video data is started, and acquires information regarding in-car recorder 62 as a communication partner (step S42). The acquired information regarding in-car recorder 62 includes at least some of the information regarding in-car recorder 62 held in the management table.

Communicator 21 notifies in-car recorder 62 regarding which the information has been acquired, that is, specific in-car recorder 62 of a video recording starting message (for example, a message "REC START") including information indicating that video recording has been started (step S43).

In specific in-car recorder 62, if wireless communicator 102 receives the video recording starting message from wearable camera 10, CPU 101 starts recording of video data which is captured by in-car camera 61 and starts storing of the video data in SSD 111 (step S44).

As mentioned above, video recording is started in specific in-car recorder 62 in conjunction with video recording starting in wearable camera 10. Thus, for example, even in a case where police officer 7 forgets a video recording starting operation on buttons 109 in patrol car 6, video data of scene 8 can be recorded and be checked in the future.

As mentioned above, in the present exemplary embodiment, a cooperating communication partner for starting video recording can be derived by using, for example, a small amount of information (for example, an officer ID or a car ID) in accordance with the way of using patrol car 6 or wearable camera 10 according to the operation of police station 5. Therefore, it is possible to save time and effort to derive a communication partner.

Since video recording is started through cooperation between wearable camera 10 and in-car recorder 62, the video recording can be started in response to a video recording starting message from one of wearable camera 10 and in-car recorder 62 even in a case where the other of wearable camera 10 and in-car recorder 62 does not start the video recording.

Therefore, for example, even in a case where police officer 7 hurries for an emergency response and thus forgets an input operation on video recording switch SW1 of wearable camera 10 or cannot perform the input operation, wearable camera 10 can also start video recording if a video recording starting trigger occurs in in-car recorder 62.

As mentioned above, according to wearable camera system 100, it is possible to improve convenience of handling video data captured by wearable camera 10. It is possible to prevent video data from being omitted for a specific period of time and thus to improve performance of monitoring scene 8 or evidence performance of the video data.

As mentioned above, wearable camera system 100 of the present exemplary embodiment includes wearable camera 10 which can be mounted on a user, in-car recorder 62 which is equipped in a vehicle in which the user rides, and in-car camera 61 which is equipped in the vehicle. In-car camera 61 includes a first capture which captures videos. In-car recorder 62 includes a first deriver which derives specific wearable camera 10 as a cooperating communication partner for recording video data from a plurality of wearable cameras 10 on the basis of an operation mode of wearable camera system 100; a first communicator which performs communication with specific wearable camera 10; and a first recorder which records first video data captured by in-car camera 61. Wearable camera 10 includes a second capture which captures videos; a second communicator which performs communication with an in-car recorder as a communication partner; and a second recorder which records second video data captured by the second capture.

The first deriver is, for example, CPU 101. The first communicator is, for example, wireless communicator 102 or wired communicator 103. The first recorder is, for example, CPU 101. The second capture is, for example, capture 11. The second communicator is, for example, communicator 21. The second recorder is, for example, MCU 19. The user is, for example, police officer 7. The vehicle is, for example, patrol car 6.

Consequently, it is possible to select a communication partner for recording video data through cooperation between wearable camera 10 and in-car recorder 62 on the basis of an operation mode (for example, an operation reference of wearable camera system 100). Therefore, since specific wearable camera 10 and in-car recorder 62 start video recording through cooperation therebetween, one of wearable camera 10 and in-car recorder 62 can assist the other thereof in the video recording operation, and thus video data can be reliably recorded in both of the devices. Thus, wearable camera system 100 can improve convenience of handling video data captured by wearable camera 10 and can thus reduce recording omission of the video data. For example, it is possible to prevent video data from being omitted for a specific period of time and thus to improve performance of monitoring scene 8 or evidence performance of the video data.

In wearable camera system 100, in a case where a first operation mode in which identification information regarding the user is held in in-car recorder 62 is set as the operation mode, in-car recorder 62 may receive identification information regarding the user from wearable camera 10. In a case where the identification information regarding the user received from wearable camera 10 matches the identification information regarding the user held in in-car recorder 62, in-car recorder 62 may derive a wearable camera which holds the matching identification information regarding the user as specific wearable camera 10.

The first operation mode is, for example, an officer mode. The identification information regarding the user is, for example, an officer ID.

For example, in an operation (first operation mode) in which a combination of a user and a vehicle is frequently changed, at least information for identifying the user is stored in wearable camera 10. Also in this case, it is possible to understand matching between the vehicle and the user using wearable camera 10 by using the identification information regarding the user and thus to set a communication partner by linking in-car recorder 62 equipped in the vehicle used by the user to wearable camera 10.

In wearable camera system 100, in a case where a second operation mode in which identification information regarding the vehicle is held in in-car recorder 62 is set as the operation mode, in-car recorder 62 may receive identification information regarding the vehicle from wearable camera 10. In a case where the identification information regarding the vehicle received from wearable camera 10 matches the identification information regarding the vehicle held in in-car recorder 62, in-car recorder 62 may derive wearable camera 10 which holds the matching identification information regarding the vehicle as specific wearable camera 10.

The second operation mode is, for example, a car mode. The identification information for the vehicle, for example, a car ID.

For example, in an operation (second operation mode) in which a combination of a user and a vehicle is not greatly changed, at least information for identifying the vehicle is stored in wearable camera 10. Also in this case, it is possible to understand matching between the vehicle and the user using wearable camera 10 by using the identification information regarding the vehicle and thus to set a communication partner by linking in-car recorder 62 equipped in the vehicle used by the user to wearable camera 10.

In wearable camera system 100, in-car recorder 62 may start recording of the first video data, and may transmit video recording starting information including information indicating that video recording has been started to specific wearable camera 10. Specific wearable camera 10 may start recording of the second video data after receiving the video recording starting information.

Consequently, since specific wearable camera 10 and in-car recorder 62 can start video recording through cooperation therebetween, one of wearable camera 10 and in-car recorder 62 can assist the other thereof in the video recording operation, and thus video data can be reliably recorded in both of the devices. Thus, wearable camera system 100 can improve convenience of handling video data captured by wearable camera 10 and can thus reduce recording omission of the video data. For example, it is possible to prevent video data from being omitted for a specific period of time and thus to improve performance of monitoring scene 8 or evidence performance of the video data.

Wearable camera system 100 of the present exemplary embodiment includes wearable camera 10 which can be mounted on a user, in-car recorder 62 which is equipped in a vehicle in which the user rides, and in-car camera 61 which is equipped in the vehicle. In-car camera 61 includes a first capture which captures videos. In-car recorder 62 includes a first communicator which performs communication with wearable camera 10, and a first recorder which records first video data captured by in-car camera 61. Wearable camera 10 includes a second capture which captures videos; a second deriver which derives specific in-car recorder 62 as a communication partner working in conjunction for recording video data from a plurality of in-car recorders 62 on the basis of an operation mode of wearable camera system 100; a second communicator which performs communication with specific in-car recorder 62; and a second recorder which records video data captured by the second capture. Second deriver is, for example, MCU 19.

Consequently, it is possible to select a communication partner for recording video data through cooperation between wearable camera 10 and in-car recorder 62 on the basis of an operation mode (for example, an operation reference of wearable camera system 100). Therefore, since wearable camera 10 and specific in-car recorder 62 start video recording through cooperation therebetween, one of wearable camera 10 and specific in-car recorder 62 can assist the other thereof in the video recording operation, and thus video data can be reliably recorded in both of the devices. Thus, wearable camera system 100 can improve convenience of handling video data captured by wearable camera 10 and can thus reduce recording omission of the video data. For example, it is possible to prevent video data from being omitted for a specific period of time and thus to improve performance of monitoring scene 8 or evidence performance of the video data.

In wearable camera system 100, in a case where a third operation mode in which identification information regarding the user is held in wearable camera 10 is set as the operation mode, wearable camera 10 receives identification information regarding the user from in-car recorder 62, and, when the identification information regarding the user received from in-car recorder 62 matches the identification information regarding the user held in wearable camera 10, wearable camera 10 may derive in-car recorder 62 which holds the matching identification information regarding the user as specific in-car recorder 62. The third operation mode is, for example, an officer mode.

Consequently, for example, in an operation (third operation mode) in which a combination of a user and a vehicle is frequently changed, at least information for identifying the user is stored in wearable camera 10. Also in this case, it is possible to understand matching between the vehicle and the user using wearable camera 10 by using the identification information regarding the user and thus to set a communication partner by linking in-car recorder 62 equipped in the vehicle used by the user to wearable camera 10.

In wearable camera system 100, in a case where a fourth operation mode in which identification information regarding the vehicle is held in wearable camera 10 is set as the operation mode, wearable camera 10 may receive identification information regarding the vehicle from in-car recorder 62. In a case where the identification information regarding the vehicle received from in-car recorder 62 matches the identification information regarding the vehicle held in wearable camera 10, in-car recorder 62 which holds the matching identification information regarding the vehicle may be derived as specific in-car recorder 62. The fourth operation mode is, for example, a car mode.

For example, in an operation (fourth operation mode) in which a combination of a user and a vehicle is not greatly changed, at least information for identifying the vehicle is stored in wearable camera 10. Also in this case, it is possible to understand matching between the vehicle and the user using wearable camera 10 by using the identification information regarding the vehicle and thus to set a communication partner by linking in-car recorder 62 equipped in the vehicle used by the user to wearable camera 10.

In wearable camera system 100, wearable camera 10 may start recording of the second video data, and may transmit video recording starting information including information indicating that video recording has been started to specific in-car recorder 62. Specific in-car recorder 62 may start recording of the first video data after receiving the video recording starting information.

Consequently, since wearable camera 10 and specific in-car recorder 62 can start video recording through cooperation therebetween, one of wearable camera 10 and specific in-car recorder 62 can assist the other thereof in the video recording operation, and thus video data can be reliably recorded in both of the devices. Thus, wearable camera system 100 can improve convenience of handling video data captured by wearable camera 10 and can thus reduce recording omission of the video data. For example, it is possible to prevent video data from being omitted for a specific period of time and thus to improve performance of monitoring scene 8 or evidence performance of the video data.

The video recording control method of the present exemplary embodiment is a video recording control method for wearable camera system 100 including wearable camera 10 which can be mounted on a user, in-car recorder 62 which is equipped in a vehicle in which the user rides, and in-car camera 61 which is equipped in the vehicle. The video recording control method includes a step of causing in-car camera 61 to capture videos; a step of causing wearable camera 10 to capture videos; a step of causing in-car recorder 62 to derive specific wearable camera 10 as a communication partner working in conjunction for recording video data from a plurality of wearable cameras 10 on the basis of an operation mode of wearable camera system 100; a step of causing in-car recorder 62 to start recording of first video data captured by in-car camera 61; a step of transmitting video recording starting information including information indicating that video recording has been started by in-car recorder 62 to specific wearable camera 10; and a step of causing specific wearable camera 10 to start recording of second video data captured by specific wearable camera 10 after receiving the video recording starting information.

Consequently, it is possible to select a communication partner for recording video data through cooperation between wearable camera 10 and in-car recorder 62 on the basis of an operation mode (for example, an operation reference of wearable camera system 100). Therefore, since specific wearable camera 10 and in-car recorder 62 start video recording through cooperation therebetween, one of wearable camera 10 and in-car recorder 62 can assist the other thereof in the video recording operation, and thus video data can be reliably recorded in both of the devices. Thus, wearable camera system 100 can improve convenience of handling video data captured by wearable camera 10 and can thus reduce recording omission of the video data. For example, it is possible to prevent video data from being omitted for a specific period of time and thus to improve performance of monitoring scene 8 or evidence performance of the video data.

The video recording control method of the present exemplary embodiment is a video recording control method for a wearable camera system including a wearable camera which can be mounted on a user, in-car recorder 62 which is equipped in a vehicle in which the user rides, and in-car camera 61 which is equipped in the vehicle. The video recording control method includes a step of causing in-car camera 61 to capture videos; a step of causing wearable camera 10 to capture videos; a step of causing wearable camera 10 to derive specific in-car recorder 62 as a communication partner working in conjunction for recording video data from a plurality of in-car recorders 62 on the basis of an operation mode of wearable camera system 100; a step of causing wearable camera 10 to start recording of second video data captured by wearable camera 10; a step of transmitting video recording starting information including information indicating that video recording has been started by wearable camera 10 to specific in-car recorder 62; and a step of causing specific in-car recorder 62 to start recording of first video data captured by in-car camera 61 after receiving the video recording starting information.

Consequently, it is possible to select a communication partner for recording video data through cooperation between wearable camera 10 and in-car recorder 62 on the basis of an operation mode (for example, an operation reference of wearable camera system 100). Therefore, since wearable camera 10 and specific in-car recorder 62 start video recording through cooperation therebetween, one of wearable camera 10 and specific in-car recorder 62 can assist the other thereof in the video recording operation, and thus video data can be reliably recorded in both of the devices. Thus, wearable camera system 100 can improve convenience of handling video data captured by wearable camera 10 and can thus reduce recording omission of the video data. For example, it is possible to prevent video data from being omitted for a specific period of time and thus to improve performance of monitoring scene 8 or evidence performance of the video data.

Next, a third exemplary embodiment of the present invention will be described. A configuration related to the third exemplary embodiment is the same as the configuration described with reference to FIGS. 1 to 9. First, a description will be made of assignment of attribute information to video data.

In wearable camera system 100, a case is assumed in which video data recorded by wearable camera 10 is transmitted to and accumulated in servers SV1 to SV3, and is used. Similarly, a case is assumed in which video data captured by in-car camera 61 is recorded by in-car recorder 62 so as to be transmitted to and accumulated in servers SV1 to SV3, and is used.

In this case, for example, in-station PC 71 can extract and reproduce target video data from the accumulated items of video data in response to an operation performed by a police officer in police station 5 on the basis of some sort of attribute information associated with video data, such as the type of video content, police officer 7 which has performed image capturing, the date and time, and an image capturing location. At this time, attribute information correlated with the video data is used. As a result of the attribute information being assigned to the video data, it is easy to discriminate captured videos from each other, and thus it becomes easier to extract target video data.

Here, wearable camera 10 assigns classification information (Classify) indicating the type of video content as the attribute information, and the video data items can be individually sorted by the type. The classification information indicates an incident category regarding content of the video data. Assignment of the attribute information to the video data is also referred to as tagging or the like. The attribute information is not limited to the classification information, and includes all types of information regarding recorded video data. The classification information, which is the attribute information, may be arranged in hierarchical structure, or may be categorized in multiple systems differently classified.

As mentioned above, in-car recorder 62 assigns classification information (Classify) indicating the type of video content as the attribute information, and the video data items can be individually sorted by the type.

FIG. 22 is a schematic diagram illustrating an example of attribute information in wearable camera 10. The attribute information is selected by operating attribute selecting switch SW4, and is assigned by operating attribute information assigning switch SW3.

In a case of using wearable camera 10, as illustrated in FIG. 22, the attribute information is allocated and is set so as to respectively correspond to states (contact point positions) C1 to C3 of attribute selecting switch SW4. In the illustrated example, a case is assumed in which police officer 7 captures images of scene 8 (for example, an incident scene). Driving under the influence is allocated to C1; drug abuse violations are allocated to C2; and stolen property is allocated to C3.

In the allocation of the attribute information, for example, MCU 19 of wearable camera 10 selects and sets attribute information which is frequently used by police officer 7 among a plurality of defined attribute information pieces. The set content of attribute information is, for example, stored in EEPROM 16 of wearable camera 10 as one of setting information pieces.

FIG. 23 is a schematic diagram illustrating an example of attribute information in in-car recorder 62. In in-car recorder 62, for example, communicator 203 acquires attribute information which is input via input 205 of in-car PC 63, and CPU 101 assigns the acquired attribute information to video data captured by in-car camera 61 and stores the attribute information in SSD 111 in association with the video data. In the assignment of the attribute information using in-car recorder 62, the number of contact points is not fixed unlike in attribute selecting switch SW4, and thus more types of attribute information can be assigned. The attribute information is stored in association with the video data alone or as meta information including the attribute information.

As illustrated in FIG. 23, police officer 7 can input any one of, for example, eleven attribute information pieces via in-car PC 63. The attribute information includes, for example, information regarding disorderly conduct, driving under the influence, drunkenness, drug abuse violations, liquor law violations, Peeping Tom, trespass of real property, stolen property, vandalism, weapons, and all other offenses.

Therefore, police officer 7 can assign attribute information which is more detailed than the attribute information used by wearable camera 10, to video data captured by, for example, in-car camera 61, and can thus assign attribute information which is more appropriate for a situation of actual scene 8.

Figure 24:
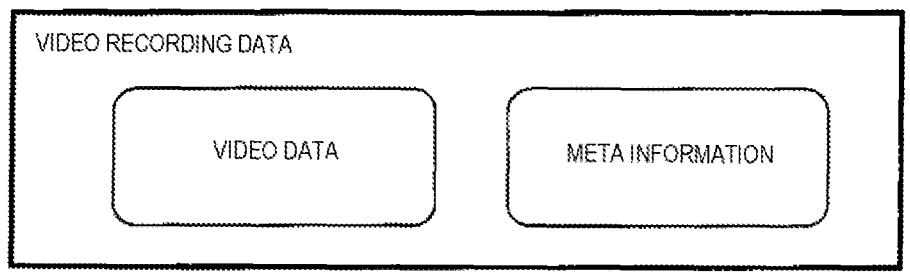
FIG. 24 is a schematic diagram illustrating an example of a data structure of video recording data according to the third exemplary embodiment of the present invention.

FIG. 24 is a schematic diagram illustrating an example of a data structure of video recording data. The video recording data includes recorded video data and meta information corresponding to the video data. The meta information includes attribute information as will be described later. Video recording data which is captured and recorded by wearable camera 10 has the same format as that of video recording data which is captured by in-car camera 61 and is recorded by in-car recorder 62.

Next, a description will be made of a data structure of a recorded video list. A recorded video list associated with video data captured by wearable camera 10 is held in storage

15 of wearable camera 10. A recorded video list associated with video data captured by in-car camera 61 is held in SSD 111 of in-car recorder 62.

FIG. 25 is a schematic diagram illustrating an example of a data structure of the recorded video list held in wearable camera 10.

If an input operation on attribute information assigning switch SW3 is detected during video recording or after video recording, wearable camera 10 generates attribute information associated with video data of a video recording target and stores meta information including the attribute information in storage 15. In other words, video recording data stored in storage 15 includes the video data and the meta information. In a case where the video data is transmitted to servers SV1 to SV3, wearable camera 10 transmits and accumulates the video recording data including the video data and the meta information to and in servers SV1 to SV3. The video data and the meta information may be transmitted separately from each other.

The meta information associated with the video data is stored in a form of the recorded video list as illustrated in FIG. 25, for example. The meta information of the recorded video list includes video position information (video time information), a car ID, an officer ID, attribute information (incident category), a video recording starting factor, and other information.

The video data and the meta information are linked to each other by using a video data ID. The video data ID is identification information for identifying recorded video data. The video data ID is assigned to the video data, for example, at the time of starting video recording, during the video recording, or at the time of completing the video recording. The video data ID includes, for example, recording start time of the video data, a file name, and other IDs.

The video position information is information regarding time at which the meta information is assigned to the video data, that is, information regarding time (also referred to as attribute information assigning time) at which an input operation on attribute information assigning switch SW3 is detected.

The car ID is identification information for identifying individual patrol car 6. The officer ID is identification information for identifying police officer 7 using wearable camera 10. By setting the car ID and the officer ID, it is possible to discriminate which police officer 7 using which patrol car 6 has recorded the video data by using wearable camera 10.

The incident category is classification information for identifying the type of video data, and is assigned in accordance with attribute selecting switch SW4 on the basis of the set content of the attribute information illustrated in FIG. 10.

The video recording starting factor indicates a factor which causes recording of the video data to be started. The video recording starting factor includes, for example, detection of pressing of video recording switch SW1 or snapshot switch SW2, detection of a video recording starting trigger based on information from the sensor (for example, an acceleration sensor), RTC 17, or GPS 18 provided in wearable camera 10, and in-car system conjunction.

The in-car system conjunction indicates that wearable camera 10 starts video recording in response to a video recording starting instruction from in-car recorder 62 through cooperation between in-car system 60 and wearable camera 10.

The other information includes, for example, GPS information. The GPS information is position information indicating a location where the video data was recorded, and, for example, current position information at the time of assigning the attribute information is acquired from GPS 18 and is assigned as the GPS information.

The meta information assigned by wearable camera 10 is assigned through processing in MCU 19, for example, and is stored in storage 15 in association with the video data captured by wearable camera 10.

One or more meta information pieces may be assigned to a single video data item, that is, a single video data ID. For example, in a case where police officer 7 observes the scene of drug abuse violations during a crackdown on driving under the influence, police officer 7 performs an input operation on attribute information assigning switch SW3 more than twice while continuing to record video data, and thus wearable camera 10 can assign two or more meta information pieces to a single video data item.

FIG. 26 is a schematic diagram illustrating an example of a data structure of the recorded video list held in in-car recorder 62.

The recorded video list held in in-car recorder 62 also includes meta information including attribute information associated with video data. The content of the meta information is the same as the content of the meta information illustrated in FIG. 25.

However, in-car recorder 62 can assign more types of attribute information (incident category) than attribute information assigned by wearable camera 10. The attribute information in in-car recorder 62 is input via, for example, input 205 of in-car PC 63 and is acquired from in-car PC 63. In in-car recorder 62, the video recording starting factor includes detection of pressing of the attribute information assigning button, detection of a video recording starting trigger based on information from the sensors (for example, a speed sensor, an acceleration sensor, and a door opening/closing sensor) provided in in-car system 60, RTC 17, or GPS 107, and WCAM conjunction.

The WCAM conjunction indicates that in-car camera 61 has started video recording under the instruction of in-car recorder 62 in response to a video recording starting instruction from wearable camera 10 through cooperation between in-car system 60 and wearable camera 10.

The meta information assigned by in-car recorder 62 is assigned through processing in CPU 101, for example, and is stored in SSD 111 in association with the video data captured by in-car camera 61.

Next, operation examples of wearable camera system 100 will be described.

Figure 27:
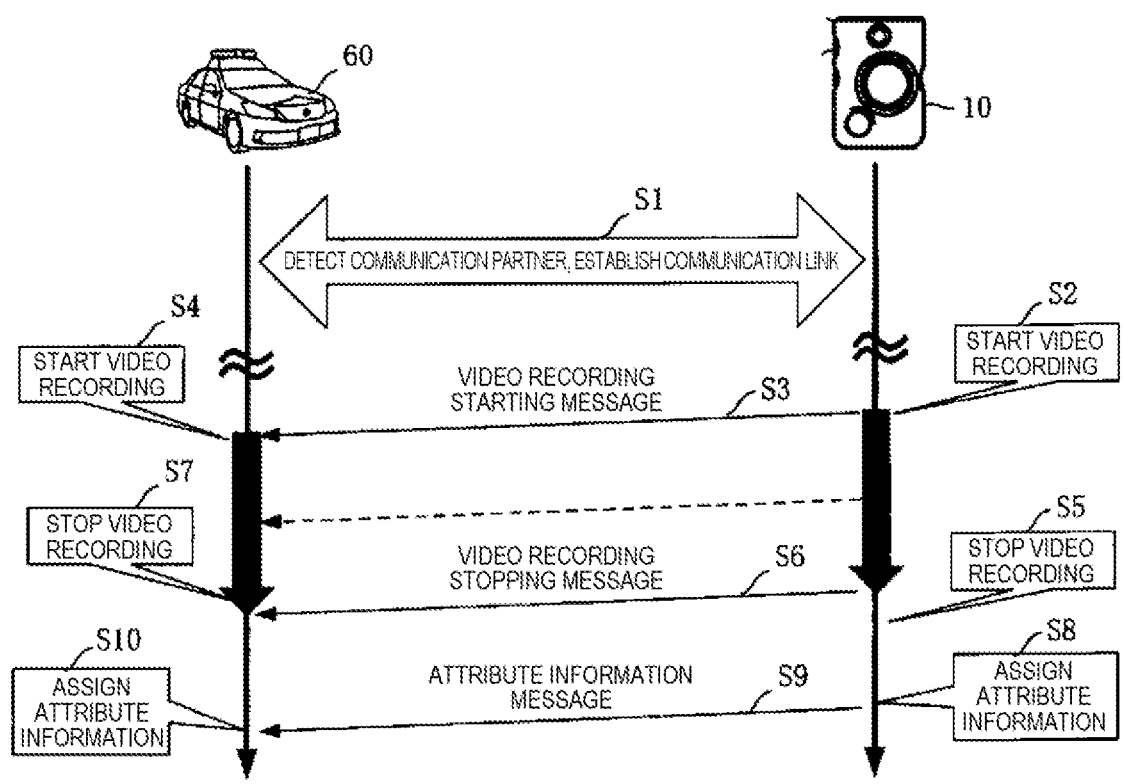
FIG. 27 is a sequence diagram illustrating a first example of an attribute information assigning procedure in a wearable camera system according to the third exemplary embodiment.

FIG. 27 is a sequence diagram illustrating a first example of an attribute information assigning procedure in wearable camera system 100. In FIG. 27, a case is assumed in which wearable camera 10 starts video recording earlier than in-car recorder 62 and assigns attribute information earlier than in-car recorder 62.

FIG. 27 exemplifies that in-car recorder 62 and wearable camera 10 are connected to each other in a wireless manner via the wireless LAN, but the recorder and the camera may be connected to each other in a wireless manner according to other methods, and may be connected to each other in a wired manner.

First, in-car recorder 62 and wearable camera 10 detect mutual communication partners so that a communication link between in-car recorder 62 and wearable camera 10 is established (step S1). Specifically, CPU 101 of in-car recorder 62 and MCU 19 of wearable camera 10 detect communication partners by performing a pairing process by using, for example, SSIDs and passwords for the wireless LAN.

Wireless communicator 102 of in-car recorder 62 and communicator 21 of wearable camera 10 exchange, for example, car IDs and officer IDs which are respectively held therein, and the communication link is established in a case where the car IDs and the officer IDs held in a host device and a communication partner device respectively match each other.

Wireless communicator 102 of in-car recorder 62 and communicator 21 of wearable camera 10 may establish the communication link when detecting communication partners without checking matching of the camera IDs and the officer IDs. For example, in a case where police officer 7 is not logging in to in-car PC 63, the camera ID and the officer ID are not input to in-car recorder 62, and thus the camera ID and the officer ID are not held in in-car recorder 62.

Even in this case, the communication link can be established between in-car system 60 and wearable camera 10. For example, even in a case where combinations of police officer 7 and patrol car 6 at the time of dispatch differ every time and thus are not fixed, in-car recorder 62 and wearable camera 10 can be easily connected to each other by using the wireless LAN or the like.

In wearable camera 10, if a video recording starting trigger is detected, MCU 19 starts recording of video data which is captured by capture 11 and starts storing of the video data in storage 15 (step S2).

The video recording starting trigger in wearable camera 10 includes, for example, detection of pressing of video recording switch SW1 or snapshot switch SW2 in MCU 19, detection of cancelation of wireless connection between in-car recorder 62 and wearable camera 10 in communicator 21, detection of an impact in the acceleration sensor (that is, detection of a change in acceleration of a predetermined threshold value or greater), detection of police officer 7 being present in a predetermined area in GPS 18, and detection of police officer 7 starting to run in GPS 18. The detection of an impact in the acceleration sensor includes detection of police officer 7 starting to run and falling.

Communicator 21 notifies in-car recorder 62 as a communication partner of a video recording starting message (for example, a message "REC START") including information indicating that video recording has been started when MCU 19 starts recording of video data (step S3).

In in-car recorder 62, if wireless communicator 102 receives the video recording starting message from wearable camera 10, CPU 101 starts recording of video data which is captured by in-car camera 61 and starts storing of the video data in SSD 111 (step S4).

As mentioned above, since video recording is started in in-car recorder 62 in conjunction with video recording starting in wearable camera 10, for example, even in a case where police officer 7 arrives at scene 8, then an incident occurs, and video recording is not started by in-car camera 61 in patrol car 6, video data of scene 8 can be recorded by in-car camera 61 and be checked in the future.

After wearable camera 10 and in-car recorder 62 start video recording, if MCU 19 of wearable camera 10 detects a video recording stopping trigger, MCU 19 stops recording of the video data captured by capture 11 and stops storing of the video data in storage 15 (step S5).

The video recording stopping trigger in wearable camera 10 includes, for example, detection of pressing of video recording switch SW1 in MCU 19 during video recording, and detection of a predetermined time period elapsing from the video recording starting in wearable camera 10.

Communicator 21 notifies in-car recorder 62 as a communication partner of a video recording stopping message (for example, a message "REC STOP") including information indicating that the video recording has stopped when MCU 19 stops recording of video data (step S6).

In in-car recorder 62, if wireless communicator 102 receives the video recording stopping message from wearable camera 10, CPU 101 stops recording of the video data captured by in-car camera 61 and stops storing of the video data in SSD 111 (step S7).

As mentioned above, since video recording is stopped in in-car recorder 62 in conjunction with video recording stoppage in wearable camera 10, for example, even in a case where police officer 7 forgets a pressing operation of buttons 109 for stopping recording video data, video data captured by in-car camera 61 can be stopped from being recorded. Therefore, it is possible to reduce unnecessary power consumption or unnecessary use of the memory due to forgetfulness of stopping of video data recording.

FIG. 27 exemplifies that wearable camera 10 stops video recording in steps S5 and S6, and in-car recorder 62 receives the video recording stopping message and stops video recording in step S7. Alternatively, in-car recorder 62 may stop video recording and may transmit the video recording stopping message in steps S5 and S6, and wearable camera 10 may receive the video recording stopping message and may stop video recording in step S7.

The processes in steps S5 to S7 may be omitted. In other words, cooperation for stopping video recording between wearable camera 10 and in-car recorder 62 may not be performed.

In wearable camera 10, after the video recording is started in step S2, MCU 19 assigns attribute information associated with video data, to the video data which is captured by capture 11 and is recorded by MCU 19 (step S8). In the assignment of the attribute information, MCU 19 stores attribute information selected by using attribute selecting switch SW4 in storage 15 in association with the video data recorded by wearable camera 10. If MCU 19 assigns the attribute information, communicator 21 notifies in-car recorder 62 as a communication partner of an attribute information message including the attribute information (step S9).

In in-car recorder 62, wireless communicator 102 receives the attribute information message from wearable camera 10. CPU 101 assigns the received attribute information to video data which is captured by in-car camera 61 and is recorded by in-car recorder 62 as attribute information associated with the video data (step S10). In the assignment of the attribute information, CPU 101 stores the attribute information (that is, the attribute information selected by using attribute selecting switch SW4) acquired from wearable camera 10 in SSD 111 in association with the video data recorded by in-car recorder 62. The respective video data items assigned with the same attribute information in wearable camera 10 and in-car recorder 62 are video data items which are recorded, for example, in the same time zone or similar time zones.

FIG. 27 exemplifies that a notification of the attribute information message is sent after wearable camera 10 stops video recording, but a notification of the attribute information message may be sent during video recording in wearable camera 10.

As mentioned above, since in-car recorder 62 assigns attribute information in conjunction with assignment of attribute information in wearable camera 10, it is possible to save time and effort for police officer 7 to perform an input operation on in-car PC 63 in order to assign the attribute information in in-car recorder 62. Also in this case, police officer 7 can easily search for necessary video data in the future by using the assigned attribute information in the future.

Since a plurality of meta information pieces can be assigned to a single video data item, a plurality of attribute information pieces can be assigned to the single video data item. In other words, both attribute information (for example, "trespass of real property") which is input via in-car PC 63 and attribute information (for example, "stolen property") corresponding to the operation of attribute information assigning switch SW3 may be assigned to video data captured by in-car camera 61. Consequently, wearable camera system 100 can discriminate content items of video data from each other with higher accuracy.

Figure 28:
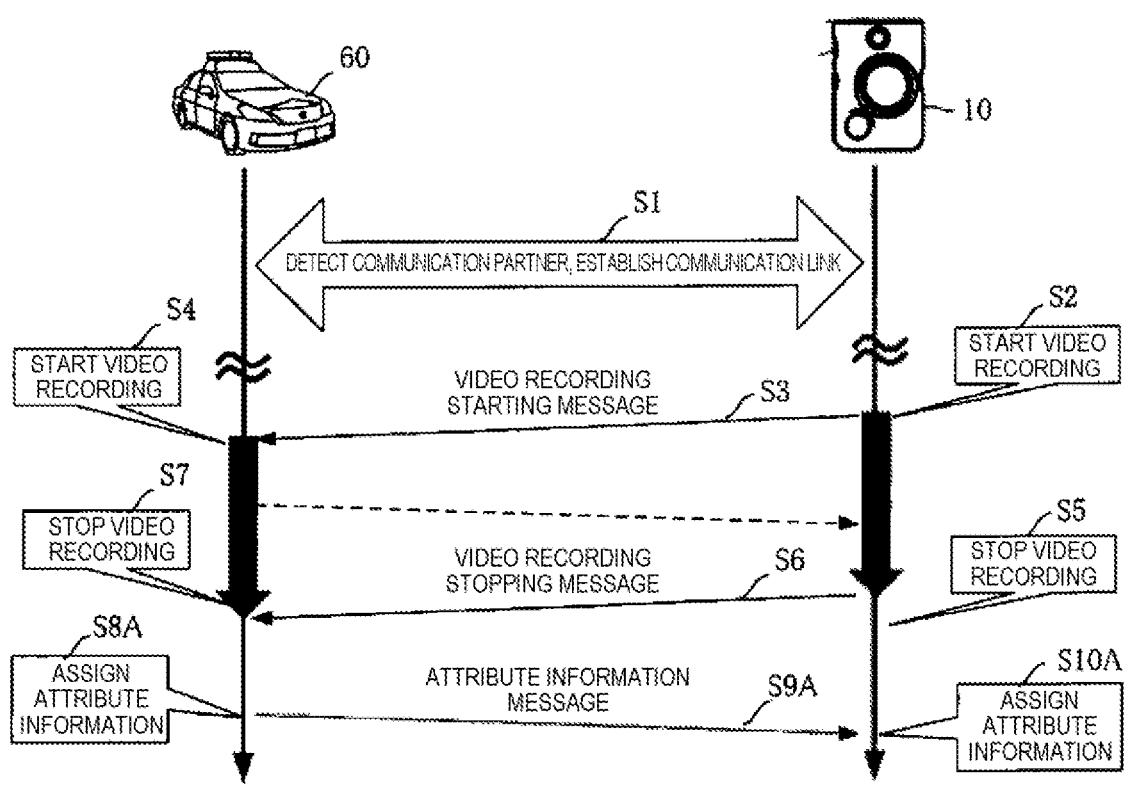
FIG. 28 is a sequence diagram illustrating a second example of an attribute information assigning procedure in the wearable camera system according to the third exemplary embodiment.

FIG. 28 is a sequence diagram illustrating a second example of an attribute information assigning procedure in wearable camera system 100. In FIG. 28, a case is assumed in which wearable camera 10 starts video recording earlier than in-car recorder 62 and assigns attribute information earlier than in-car recorder 62. In the operation example illustrated in FIG. 28, the same processes in the operation example illustrated in FIG. 27 are given the same step numbers, and description thereof will be omitted or will be made briefly.

First, wearable camera system 100 performs processes in steps S1 to S7.

In in-car recorder 62, after the video recording is started in step S4, CPU 101 assigns attribute information associated with video data, to the video data which is captured by in-car camera 61 and is recorded by in-car recorder 62 (step S8A). In the assignment of the attribute information, CPU 101 stores attribute information which is input via in-car PC 63 in SSD 111 in association with the video data recorded by in-car recorder 62.

If CPU 101 assigns the attribute information, wireless communicator 102 notifies wearable camera 10 as a communication partner of an attribute information message including the attribute information (step S9A).

In wearable camera 10, communicator 21 receives the attribute information message from in-car recorder 62. MCU 19 assigns the received attribute information to video data which is captured by capture 11 and is recorded by MCU 19 as attribute information associated with the video data (step S10A). In the assignment of the attribute information, MCU 19 stores the attribute information (that is, the attribute information which is input via in-car PC 63) acquired from in-car recorder 62 in storage 15 in association with the video data recorded by wearable camera 10. The respective video data items assigned with the same attribute information in wearable camera 10 and in-car recorder 62 are video data items which are recorded, for example, in the same time zone or similar time zones.

FIG. 28 exemplifies that a notification of the attribute information message is sent after in-car recorder 62 stops video recording, but a notification of the attribute information message may be sent during video recording in in-car recorder 62.

As mentioned above, since wearable camera 10 assigns attribute information in conjunction with assignment of attribute information in in-car recorder 62, it is possible to assign the attribute information other than the attribute information allocated to attribute selecting switch SW4 and thus to extend assignment of attribute information in wearable camera 10. Since in-car recorder 62 can assign more types of attribute information than attribute information assigned by wearable camera 10, it is possible to increase association between incident content and assigned attribute information even in a case where the incident content in scene 8 does not match the attribute information in wearable camera 10, or details cannot be shown in the attribute information in wearable camera 10.

Since a plurality of meta information pieces can be assigned to a single video data item, a plurality of attribute information pieces can be assigned to the single video data item. Both attribute information (for example, "driving under the influence") corresponding to the operation of attribute information assigning switch SW3 and attribute information (for example, "vandalism") which is input via in-car PC 63 may be assigned to video data captured by wearable camera 10. Consequently, wearable camera system 100 can discriminate content items of video data from each other with higher accuracy. Instead of both of the attribute information pieces not being assigned, the attribute information which is assigned by operating attribute information assigning switch SW3 may be replaced with the attribute information which is input via in-car PC 63.

Figure 29:
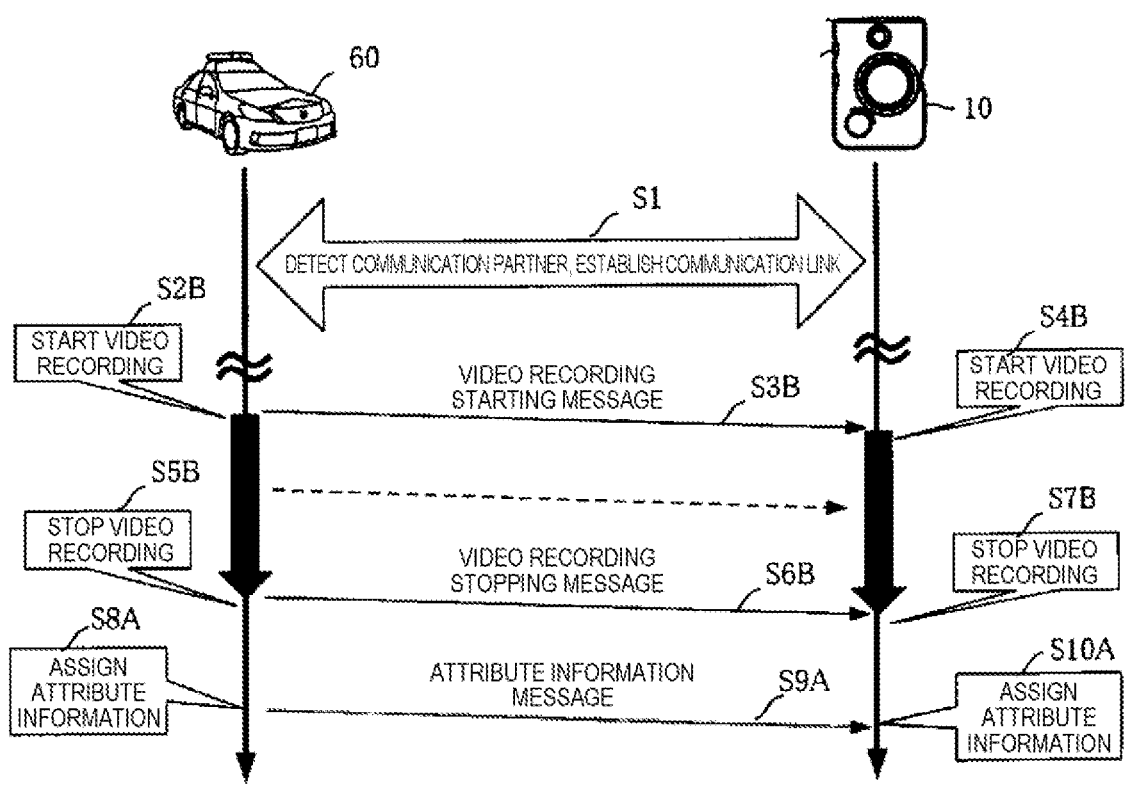
FIG. 29 is a sequence diagram illustrating a third example of an attribute information assigning procedure in the wearable camera system according to the third exemplary embodiment.

FIG. 29 is a sequence diagram illustrating a third example of an attribute information assigning procedure in wearable camera system 100. In FIG. 29, a case is assumed in which wearable camera 10 starts video recording later than in-car recorder 62 and assigns attribute information later than in-car recorder 62. In the operation example illustrated in FIG. 29, the same processes in the operation example illustrated in FIG. 27 or FIG. 28 are given the same step numbers, and description thereof will be omitted or will be made briefly.

First, wearable camera system 100 performs a process in step S1.

In in-car recorder 62, if a video recording starting trigger is detected, CPU 101 starts recording of video data which is captured by in-car camera 61 and starts storing of the video data in SSD 111 (step S2B).

The video recording starting trigger in in-car recorder 62 includes, for example, detection of pressing of buttons 109, detection of starting of lighting and ringing of patrol lamps of patrol car 6 in CPU 101, detection of a traveling speed of patrol car 6 being equal to or higher than a predetermined speed (for example, 100 km/h) in the speed sensor, detection of an impact in the acceleration sensor (that is, detection of a change in acceleration of a predetermined threshold value or greater), and detection of being out of a communication range in which communication between wireless communicator 102 and wearable camera 10 cannot be performed.

Wireless communicator 102 notifies wearable camera 10 as a communication partner of a video recording starting message (for example, a message "REC START") including information indicating that video recording has started when CPU 101 starts recording of video data (step S3B).

In wearable camera 10, if communicator 21 receives the video recording starting message from in-car recorder 62, MCU 19 starts recording of video data which is captured by capture 11 and starts storing of the video data in storage 15 (step S4B).

As mentioned above, since video recording is started in wearable camera 10 in cooperation with video recording starting in in-car recorder 62, for example, even in a case where police officer 7 forgets a video recording starting operation on video recording switch SW1 or snapshot switch SW2 of wearable camera 10 due to emergency response, video data of scene 8 can be recorded and be checked in the future.

For example, in a case where in-car recorder 62 and wearable camera 10 have a long distance therebetween and are thus out of a communication range using the wireless LAN when a video recording starting trigger is detected, in-car recorder 62 may transmit a video recording starting message after the wireless connection is recovered.

Wearable camera 10 may not start video recording immediately after receiving the video recording starting message. For example, wearable camera 10 may not start video recording when the video recording starting message is received during traveling of patrol car 6, and may start video recording when detecting that the wireless connection with in-car recorder 62 is canceled due to becoming distant from patrol car 6. Consequently, it is possible to use a resource of storage 15 which accumulates recorded video data, with high efficiency.

After in-car recorder 62 and wearable camera 10 start video recording, if CPU 101 of in-car recorder 62 detects a video recording stopping trigger, CPU 101 stops recording of the video data captured by in-car camera 61 and stops storing of the video data in SSD 111 (step S5B).

The video recording stopping trigger in in-car recorder 62 includes, for example, detection of pressing of buttons 109 in CPU 101 during video recording, and detection of a predetermined time period elapsing from the video recording starting in in-car recorder 62.

Wireless communicator 102 notifies wearable camera 10 as a communication partner of a video recording stopping message (for example, a message "REC STOP") including information indicating that the video recording has stopped when CPU 101 stops recording of video data (step S6B).

In wearable camera 10, if communicator 21 receives the video recording stopping message from in-car recorder 62, MCU 19 stops recording of the video data captured by capture 11 and stops storing of the video data in storage 15 (step S7B).

As mentioned above, since video recording is stopped in wearable camera 10 in cooperation with video recording stoppage in in-car recorder 62, for example, even in a case where police officer 7 forgets a video recording stopping operation on video recording switch SW1 of wearable camera 10 due to emergency response, video data of scene 8 can be stopped from being recorded. Therefore, it is possible to reduce unnecessary power consumption or unnecessary use of the memory due to forgetfulness of stopping of video data recording.

FIG. 29 exemplifies that in-car recorder 62 stops video recording and transmits the video recording stopping message in steps S5B and S6B, and wearable camera 10 receives the video recording stopping message and stops video recording in step S7B. Alternatively, wearable camera 10 may stop video recording and may transmit the video recording stopping message in steps S5B and S6B, and in-car recorder 62 may receive the video recording stopping message and may stop video recording in step S7B.

The processes in steps S5B to S7B may be omitted. In other words, cooperation for stopping video recording between in-car recorder 62 and wearable camera 10 may not be performed.

For example, in a case where in-car recorder 62 and wearable camera 10 have a long distance therebetween and are thus out of a communication range using the wireless LAN when a video recording stopping trigger is detected, in-car recorder 62 may transmit a video recording stopping message after the wireless connection is recovered.

Wearable camera system 100 performs processes in steps S8A to S10A after video recording is started in step S2B.

In FIG. 29, there may be a plurality of wearable cameras 10 which receive a video recording starting message and start video recording. Similarly, there may be a plurality of wearable cameras 10 which receive a video recording stopping message and stop video recording. Similarly, there may be a plurality of wearable cameras 10 which receive an attribute information message and assign attribute information. For example, it is assumed that a plurality of police officers 7 ride in patrol car 6.

FIG. 30 is a sequence diagram illustrating a fourth example of an attribute information assigning procedure in wearable camera system 100. In FIG. 30, a case is assumed in which wearable camera 10 starts video recording later than in-car recorder 62 and assigns attribute information earlier than in-car recorder 62. In the operation example illustrated in FIG. 30, the same processes in the operation example illustrated in FIGS. 27 to 29 are given the same step numbers, and description thereof will be omitted or will be made briefly.

Wearable camera system 100 performs processes in steps S1 and S2B to S7B. Wearable camera system 100 performs processes in steps S8 to S10 after video recording is started in step S4B.

In FIG. 30, there may be a plurality of wearable cameras 10 which receive a video recording starting message and start video recording. Similarly, there may be a plurality of wearable cameras 10 which receive a video recording stopping message and stop video recording. Similarly, there may be a plurality of wearable cameras 10 which assign attribute information and notify the attribute information message. For example, it is assumed that a plurality of police officers 7 ride in patrol car 6.

FIGS. 27 to 30 exemplify that attribute information is assigned by wearable camera 10 and in-car recorder 62, but some meta information pieces including the attribute information or all of the meta information pieces may be assigned. It is exemplified that a communication partner is notified of an attribute information message including attribute information, but a notification of a meta information message including some meta information pieces including the attribute information or all of the meta information pieces may be sent. Consequently, wearable camera 10 and in-car recorder 62 can cooperate with each other in relation to assignment of meta information. Therefore, for example, wearable camera 10 or in-car recorder 62 may receive an attribute information message or a meta information message so as to add new meta information to a recorded video list held therein or to update existing meta information.

As mentioned above, in the present exemplary embodiment, since wearable camera 10 and in-car recorder 62 start video recording through cooperation therebetween, the video recording can be started in response to a video recording starting message from one of wearable camera 10 and in-car recorder 62 even in a case where the other of wearable camera 10 and in-car recorder 62 does not start the video recording.

Therefore, for example, even in a case where police officer 7 hurries for an emergency response and thus forgets an input operation on video recording switch SW1 of wearable camera 10 or cannot perform the input operation, wearable camera 10 can also start video recording if a video recording starting trigger occurs in in-car recorder 62.

Since wearable camera 10 and in-car recorder 62 assign attribute information through cooperation therebetween, the attribute information can be assigned in response to an attribute information message from one of wearable camera 10 and in-car recorder 62 even in a case where the other of wearable camera 10 and in-car recorder 62 does not assign the attribute information. In a case where in-car recorder 62 uses attribute information assigned by wearable camera 10, it is not necessary to input attribute information via in-car PC 63. In a case where wearable camera 10 uses attribute information assigned by in-car recorder 62, it is possible to increase variations of attribute information which can be assigned by wearable camera 10 and thus to extend the attribute information assigning function of wearable camera 10.

As mentioned above, according to wearable camera system 100, it is possible to improve convenience of handling video data captured by wearable camera 10. It is possible to easily search for and extract video data which is captured by wearable camera 10 or in-car camera 61 by using attribute information and thus to improve performance of monitoring scene 8 or evidence performance of the video data.

As mentioned above, wearable camera system 100 of the present exemplary embodiment includes wearable camera 10 which can be mounted on a user, in-car recorder 62 which is equipped in a vehicle in which the user rides, and in-car camera 61 which is equipped in the vehicle. In-car camera 61 includes a first capture which captures videos. In-car recorder 62 includes a first communicator which performs communication with wearable camera 10 as a communication partner; a first recorder which records first video data captured by in-car camera 61; and a first information assigner which assigns first attribute information associated with the first video data to the first video data. Wearable camera 10 includes a second capture which captures videos; a second communicator which performs communication with in-car recorder 62 as a communication partner; a second recorder which records second video data captured by the second capture; and a second information assigner which assigns second attribute information associated with the second video data to the second video data.

Wearable camera 10 starts video recording by using the second recorder, assigns the second attribute information to the second video data, and transmits the second attribute information to in-car recorder 62. In-car recorder 62 receives the second attribute information, and assigns the second attribute information to the first video data as the first attribute information. Alternatively, in-car recorder 62 starts video recording by using the first recorder, assigns the first attribute information to the first video data, and transmits the first attribute information to wearable camera 10. Wearable camera 10 receives the first attribute information, and assigns the first attribute information to the second video data as the second attribute information.

The first communicator is, for example, wireless communicator 102 or wired communicator 103. The first recorder is, for example, CPU 101. The first information assigner is, for example, CPU 101. The second capture is, for example, capture 11. The second recorder is, for example, MCU 19. The second information assigner is, for example, MCU 19. The user is, for example, police officer 7. The vehicle is, for example, patrol car 6.

Consequently, since wearable camera 10 and in-car recorder 62 assign attribute information through cooperation therebetween, one of wearable camera 10 and in-car recorder 62 can assist the other thereof in the operation of assigning the attribute information, and thus assignment of the attribute information in both of the devices can be simplified. For example, by using attribute information assigned by wearable camera 10 as attribute information assigned by in-car recorder 62, the user can omit an input operation on an input device (for example, in-car PC 63). For example, by using attribute information assigned by in-car recorder 62 as attribute information assigned by wearable camera 10, it is possible to assign many types of attribute information in wearable camera 10. Therefore, wearable camera system 100 can improve convenience of handling video data captured by wearable camera 10 or in-car camera 61.

In wearable camera system 100, one of in-car recorder 62 and wearable camera 10 may transmit video recording starting information including information indicating that video recording has been started to the other of in-car recorder 62 and wearable camera 10 when one of in-car recorder 62 and wearable camera 10 starts the video recording. The other of in-car recorder 62 and wearable camera 10 may start the video recording after the video recording starting information is received.

Consequently, since wearable camera 10 and in-car recorder 62 start video recording through cooperation therebetween, one of wearable camera 10 and in-car recorder 62 can assist the other thereof in the video recording operation, and thus video data can be reliably recorded in both of the devices. Thus, wearable camera system 100 can improve convenience of handling video data captured by wearable camera 10 and can thus reduce recording omission of the video data. Therefore, for example, it is possible to improve monitoring performance of wearable camera system 100 or evidence performance of video data.

In wearable camera system 100, in-car recorder 62 may acquire the first attribute information from an input device via which the first attribute information is input. Wearable camera 10 may include an operator which receives an operation of assigning the second attribute information. The input device is, for example, in-car PC 63. The operator is, for example, attribute information assigning switch SW3.

Consequently, wearable camera system 100 can share attribute information which is input by using different input methods with different devices and can thus share convenience with the different devices.

In wearable camera system 100, the types of first attribute information may be more than the types of second attribute information.

Consequently, it is possible to assign attribute information in which content of video data is reflected more accurately by using the in-car recorder and thus to provide the attribute information to wearable camera 10.

In wearable camera system 100, wearable camera 10 may assign both of the first attribute information received from in-car recorder 62 and the second attribute information received by the operator to the second video data.

Consequently, since a plurality of attribute information pieces assigned by in-car recorder 62 and wearable camera 10 can be associated with a single video data item, it is possible to assign the multilateral attribute information to the video data. Therefore, wearable camera system 100 can designate attribute information from various viewpoints in the future and search for or extract video data by using the attribute information.

In wearable camera system 100, in-car recorder 62 may assign both of the second attribute information received from wearable camera 10 and the first attribute information acquired from the input device to the first video data.

Consequently, since a plurality of attribute information pieces assigned by in-car recorder 62 and wearable camera 10 can be associated with a single video data item, it is possible to assign the multilateral attribute information to the video data. Therefore, wearable camera system 100 can designate attribute information from various viewpoints in the future and search for or extract video data by using the attribute information.

The attribute information assigning method of the present exemplary embodiment is a method for wearable camera system 100 including wearable camera 10 which can be mounted on a user, in-car recorder 62 which is equipped in a vehicle in which the user rides, and in-car camera 61 which is equipped in the vehicle. The attribute information assigning method includes a step of causing in-car camera 61 to capture videos; causing wearable camera 10 to capture videos; a first video recording step of causing in-car recorder 62 to record first video data captured by in-car camera 61; a second video recording step of causing wearable camera 10 to record second video data captured by wearable camera 10; a first information assigning step of assigning first attribute information associated with the first video data to the first video data; a second information assigning step of assigning second attribute information associated with the second video data to the second video data; and a communication step of performing communication between in-car recorder 62 and wearable camera 10.

In the attribute information assigning method, recording of the second video data is started in the second video recording step, then the second attribute information is assigned to the second video data in the second information assigning step, the second attribute information is transmitted from wearable camera 10 to in-car recorder 62 in the communication step, and the second attribute information is assigned to the first video data as the first attribute information in the first information assigning step. Alternatively, in the attribute information assigning method, recording of the first video data is started in the first video recording step, then the first attribute information is assigned to the first video data in the first information assigning step, the first attribute information is transmitted from in-car recorder 62 to wearable camera 10 in the communication step, and the first attribute information is assigned to the second video data as the second attribute information in the second information assigning step.

Consequently, since wearable camera 10 and in-car recorder 62 assign attribute information through cooperation therebetween, one of wearable camera 10 and in-car recorder 62 can assist the other thereof in the operation of assigning the attribute information, and thus assignment of the attribute information in both of the devices can be simplified. For example, by using attribute information assigned by wearable camera 10 as attribute information assigned by in-car recorder 62, the user can omit an input operation on an input device (for example, in-car PC 63). For example, by using attribute information assigned by in-car recorder 62 as attribute information assigned by wearable camera 10, it is possible to assign many types of attribute information in wearable camera 10. Therefore, wearable camera system 100 can improve convenience of handling video data captured by wearable camera 10 or in-car camera 61.

As mentioned above, various embodiments have been described with reference to the drawings, but the present invention is not limited to the embodiments. It is clear that a person skilled in the art can conceive of various modifications or alterations within the scope recited in the claims, and it is understood that they naturally fall within the technical scope of the present invention. The respective constituent elements in the above-described embodiments may be arbitrarily combined with each other within the scope without departing from the spirit of the present invention.

What is claimed is:

1. A wearable camera that records image data in cooperation with an in-car camera system mounted on a vehicle, the wearable camera comprising:
    an image capture device which, in operation, captures image data corresponding to an image;
    at least one processor;
    at least one sensor coupled to the at least one processor;
    at least one switch coupled to the at least one processor;
    at least one notification device coupled to the at least one processor; and
    at least one memory device storing at least one program that, when executed by the at least one processor, causes the wearable camera to:
        record, in the at least one memory device, image data captured by the image capture device, in response to a recording starting trigger being received from the at least one switch or the at least one sensor;
        record, in the at least one memory device, starting factor information, wherein the starting factor information indicates that the image data was recorded in response to the recording starting trigger being received from the at least one switch if the recording starting trigger was received from the at least one switch, and the starting factor information indicates that the image data was recorded in response to the recording starting trigger being received from the at least one sensor if the recording starting trigger was received from the at least one sensor; and
        notify, via the notification device, the starting factor information to a user of the wearable camera while the image data are being recorded in the at least one memory device,
    wherein the notification device has at least two notification states including a first state in which the notification device indicates that the image data was recorded in response to the recording starting trigger being received from the at least one switch and a second state in which the notification device indicates that the image data was recorded in response to the recording starting trigger being received from the at least one sensor.

2. The wearable camera according to claim 1, wherein the at least one program, when executed by the at least one processor, causes the wearable camera to start or stop the recording of the image data according to a number of inputs received by the at least one switch.

3. The wearable camera according to claim 1, wherein the notification device includes at least one light emitting device.

4. The wearable camera according to claim 3, wherein the at least one program, when executed by the at least one processor, causes the wearable camera to notify the recording starting factor information by changing a lighting time, a blinking method, or a lighting color of the at least one light emitting device.

5. The wearable camera according to claim 1, wherein the at least one program, when executed by the at least one processor, causes the wearable camera to notify the recording starting factor information by vibrating the wearable camera.

6. The wearable camera according to claim 1, wherein the at least one program, when executed by the at least one processor, causes the wearable camera to transmit the image data and the starting factor information to the in-car camera system.

7. A wearable camera that records image data in cooperation with an in-car camera system mounted on a vehicle, the wearable camera comprising:
- an image capture device which, in operation, captures image data corresponding to an image;
- a communication device which, in operation, communicates with the in-car camera system;
- at least one processor;
- at least one switch coupled to the at least one processor;
- an acceleration sensor which, in operation, detects an acceleration of the wearable camera;
- at least one notification device coupled to the at least one processor; and
- at least one memory device storing at least one program that, when executed by the at least one processor, causes the wearable camera to:
  - record, in the at least one memory device, the image data captured by the image capture device, in response to a recording starting trigger being received from the at least one switch or the acceleration sensor;
  - record, in the at least one memory device, starting factor information, wherein the starting factor information indicates that the image data was recorded in response to the recording starting trigger being received from the at least one switch if the recording starting trigger was received from the at least one switch, and the starting factor information indicates that the image data was recorded in response to the recording starting trigger being received from the acceleration sensor if the recording starting trigger was received from the acceleration sensor; and
  - notify, via the notification device, the starting factor information to a user of the wearable camera while the image data are being recorded in the at least one memory device,
- wherein the notification device has at least two notification states including a first state in which the notification device indicates that the image data was recorded in response to the recording starting trigger being received from the at least one switch and a second state in which the notification device indicates that the image data was recorded in response to the recording starting trigger being received from the at least one sensor.

8. The wearable camera of claim 7, wherein the at least one program, when executed by the at least one processor, causes the wearable camera to record the image data, in response to the acceleration sensor detecting a change in acceleration of a predetermined threshold value or greater.

9. The wearable camera of claim 8,
wherein the change in the acceleration detected by the acceleration sensor indicates that the user of the wearable camera has starting to run or has fallen.

10. The wearable camera of claim 7, further comprising:
a receiver which, in operation, receives information indicating a current position of the wearable camera,
wherein the at least one program, when executed by the at least one processor, causes the wearable camera to record the image data, in response to the information indicating the current position of the wearable camera;
wherein the starting factor information indicates that the image data was recorded in response to the information indicating the current position of the wearable camera.

11. The wearable camera of claim 7, wherein the at least one program, when executed by the at least one processor, causes the wearable camera to transmit the image data and the starting factor information to the in-car device via the communication device.

12. A method for using a wearable camera that records image data in cooperation with an in-car camera system mounted on a vehicle, the method comprising:
- capturing image data corresponding to an image;
- receiving a recording starting trigger from at least one switch or at least one sensor;
- in response to receiving the recording starting trigger, recording image data captured by the capturing;
- recording starting factor information, wherein the starting factor information indicates that the image data was recorded in response to the recording starting trigger being received from the at least one switch if the recording starting trigger was received from the at least one switch, and the starting factor information indicates the image data was recorded in response to the recording starting trigger being received from the at least one sensor if the recording starting trigger was received from the at least one sensor; and
- notifying, via a notification device, the starting factor information to a user of the wearable camera during the recording of the image data,
- wherein the notification device has at least two notification states including a first state in which the notification device indicates that the image data was recorded in response to the recording starting trigger being received from the at least one switch and a second state in which the notification device indicates that the image data was recorded in response to the recording starting trigger being received from the at least one sensor.

13. The method of claim 12, further comprising:
receiving a signal from the in-car camera system; and
in response to receiving the signal from the in-car camera system, recording the image data,
wherein the starting factor information indicates that the image data was recorded in response to the signal being received from the in-car camera system.

14. The method of claim 12, wherein the at least one sensor includes an acceleration sensor, and the starting factor information indicates that the image data was recorded in response to receiving the recording starting trigger from the acceleration sensor if the recording starting trigger was received from the acceleration sensor.

15. The method of claim 12, further comprising starting or stopping the capturing according to a number of inputs received by a switch.

16. The method of claim 12, wherein the notifying includes changing a lighting time, a blinking method, or a lighting color of a light emitting device.

17. The method of claim 12, wherein the notifying includes vibrating the wearable camera.

18. The method of claim 12, further comprising detecting a change in an acceleration of the wearable camera and starting the recording of the image data when the detected change in acceleration is a predetermined threshold value or greater.

19. The method of claim 12, further comprising receiving information indicating a current position of the wearable camera and starting the recording of the image data based on the received information indicating the current position of the wearable camera.

20. The method of claim 19, wherein the starting factor information indicates that the image data was stored based on the current position of the wearable camera.

21. The method of claim 12, further comprising:
   transmitting the image data and the starting factor information to the in-car camera system.

* * * * *